(12) United States Patent
De Brabander

(10) Patent No.: US 7,603,651 B2
(45) Date of Patent: Oct. 13, 2009

(54) LANGUAGE MODELLING SYSTEM AND A FAST PARSING METHOD

(76) Inventor: Filip De Brabander, Frans Van Ryhovelaan, 280 - B - 9000, Gent (BE) 9000

( * ) Notice: Subject to any disclaimer, the term of this patent is extended or adjusted under 35 U.S.C. 154(b) by 1636 days.

(21) Appl. No.: 10/446,193

(22) Filed: May 28, 2003

(65) Prior Publication Data

US 2004/0243387 A1    Dec. 2, 2004

(51) Int. Cl.
*G06F 9/44* (2006.01)
*G06F 17/27* (2006.01)

(52) U.S. Cl. .................. 717/105; 717/109; 717/113; 704/9

(58) Field of Classification Search .............. None
See application file for complete search history.

(56) References Cited

U.S. PATENT DOCUMENTS 5,838,973 A    11/1998    Carpenter-Smith et al.
5,987,246 A *  11/1999    Thomsen et al. ............ 717/109

OTHER PUBLICATIONS

Esser et al, "MOSES-A Tool Suite for Visual Modeling of Discrete-Event Systems", Symposia on Human-Centric Computing, IEEE Computer Society, 2001.*

* cited by examiner

*Primary Examiner*—David R Hudspeth
*Assistant Examiner*—Samuel G Neway
(74) *Attorney, Agent, or Firm*—Sughrue Mion, PLLC

(57) ABSTRACT

The described methods and systems allow to develop RTN-compatible grammatical models, for syntax or other linguistical levels, within one integrated development software environment (IDE) that is efficient, controllable and overviewable, because editing is done through a 2D/3D graphical user interface (GUI) with a pointing device (e.g. a mouse). Instantaneous evaluation of any fresh change to the grammar is carried out by re-parsing a test corpus of typically thousands of sentences, functioning as language examples to try to comply with, yielding immediate statistical feedback on parsability, thanks to an integrated new fast parsing method. Problematic corpus sentences can automatically be brought under the user's attention, who can visually zoom in on a problem spot in the model or the sentence without losing the overview. All this increases efficiency and quality in grammar model development. The integrated parser can also be used separately, for instance for machine translation, and is based on efficient concatenation of pre-calculated partial pathways through the RTN grammar. These are exhaustively calculated within reasonable preset limits.

4 Claims, 16 Drawing Sheets

Parametrising a smooth surface

Figure 1:
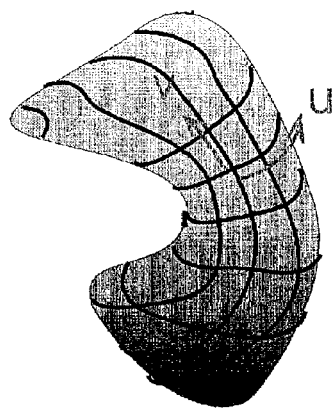

Parameterlines lead to quadrangles. These can be divided into two triangles each Relation between eye of viewer
and fixed scene coordinates A triangle is defined in 3D by its 3 edges and the normal vector in each of those edges. The normals can slightly differ from being perpedicular to the triangle, because they are influenced by the planes of neighbouring triangles, to suggest a smooth surface.

The rendering engine uses a flat bitmap to wallpaper a triangle-covered shape.

Two image buffers are used: one for drawing in, one for displaying. They are swapped into view as soon as the drawing is finished in them. This allows to hide partially drawn pictures and to suggest continuous movement.

Composition of a reflexive transition
arrow: 2 tubes + a torussector

Loop spread spatially over 180° if
there are two

Loop spread spatially over 120° if
there are three, etc...

A straight arrow is composed of a cylinder, and 2 conic pieces

For transitions between different nodes,
if there is only one transition, the arrow is straight.
If there are several, they again spread in space.

FSM

FSM1 "S"   FSM2 "P"

An RTN Overview view

View of one particular member FSM

An RTN overview, plus the internal structure of several of its member FSMs.

Example of a simple syntactical RTN

The representation of a Parse Tree:
Example for the example RTN

'Opening' FSMs in the Parse Tree

Stairgraph pathway in detail shows the Steps

Stairgraph pathway in detail shows the Links (darkgreen)

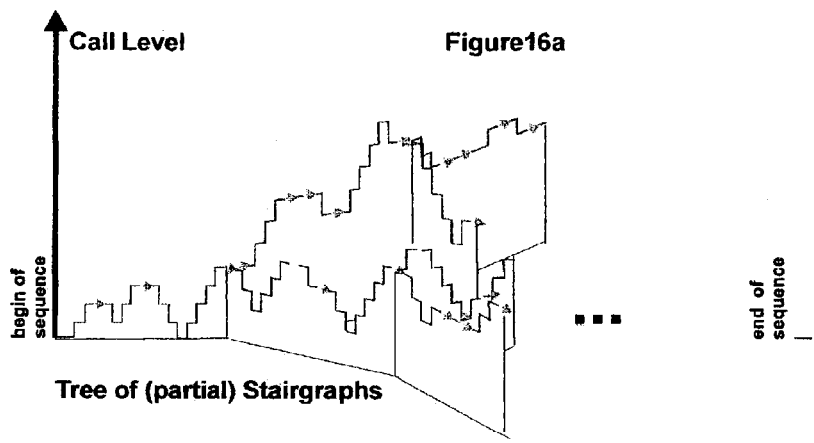
Tree of (partial) Stairgraphs
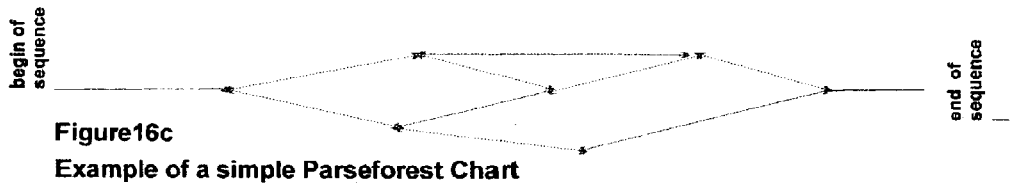
Figure16b
Corresponding left part of Chart
Figure16c
Example of a simple Parseforest Chart
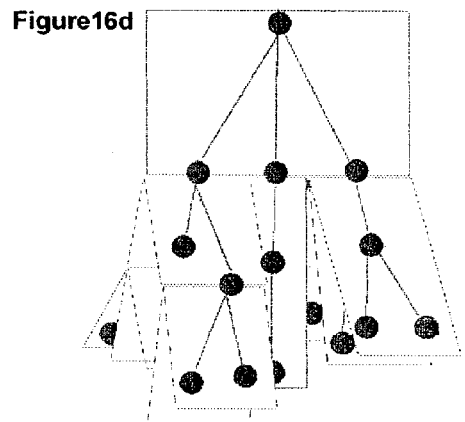
Figure16d
Example of a ChartTree representing
a Parseforest.

Figure 17

```
GenerateAllLinks function
{
        For every FSM in the RTN
        {
             start a path from the entrystate
             set the entrystate as the current state
             call RecursivelyGenerateLinks for the current
                                          entrystate and the current path
        }
}
RecursivelyGenerateLinks function
{
        for every transition starting from the current state
        {
             if it's a calling transition, calling another FSM
             {
                   if the path started at the entrystate
                         generate a Link of type 8 for the currently
                                                    obtained path
                   else if the path started at a terminal transition
                         generate a Link of type 2 for the currently
                                                    obtained path
                   else (the past must have started at a calling transition)
                         generate a Link of type 5 for the currently
                                                    obtained path }
             else if its a terminal transition
             {
                   if the path started at the entrystate
                         generate a Link of type 7 for the currently
                                                    obtained path
                   else if the path started at a terminal transition
                         generate a Link of type 1 for the currently
                                                    obtained path
                   else (the past must have started at a calling transition)
                         generate a Link of type 4 for the currently
                                                    obtained path
             }
             else it must be a zero transition
             {
                   append the zero transition at the end of the path and set
                         the current state to the state at the other side
                         of the zero transition
                   call RecursivelyGenerateLinks function for the current
                                                    state and path
                   remove the zero transition again from the end of the path
                   if the current state is the exit state
                   {
                         if the path started at a terminal transition
                               generate a Link of type 3 for the currently
                                                          obtained path
                         else (the past must have started at a calling
                                                          transition)
                               generate a Link of type 6 for the currently
                                                          obtained path
                   }
             }
        }
}
```

Figure 18

```
GenerateAllBiSwings function
{
    For every terminal1 in the RTN
    {
        For every Link starting with a terminal1 transition
        {
            start a path (a sequence of Links ) from this
                                                    Link
            choose it as the current path.
            call RecursivelyGenerateBiSwings for the current
                                                        path
        }
    }
}
RecursivelyGenerateBiSwings function
{
    consider the transition on which the last link of the
                                            current path ends
    for all links that start from this same transition (same
                                            FSM, same place)
    {
        if Link is not climbing OR
            (Link is climbing AND there is a corresponding
        Link in the down slope of the Link path)
        {
            append the Link at the end of the current path
            if the Link doesn't end on a terminal2
            {
                if the levelspan of the path isn't too high
                {
                    call RecursivelyGenerateBiSwings
                    function for the current path
                }
            }
            else (the Link ends on Terminal2)
            {
                generate a BiSwing from the current path
                add the BiSwing to the list for
                                    (Terminal1,Terminal2)
            }
            remove the Link again from the end of the path
        }
    }
}
```

LANGUAGE MODELLING SYSTEM AND A FAST PARSING METHOD

I PREAMBLE

State of the Art

Today, software environments exist that allow linguists to develop language models and to analyse automatically words and sentences from texts in natural language. The language model development with such established means remains a tedious task full of dangers to make mistakes by lack of overview or immediate feedback on the improvement or deterioration a change to the model brings about on a large, representative number of sentences. To improve the ease of making the changes, there already exist graphically oriented input possibilities, based on a two dimensional visualisation of parts of the language model. Also, statistical feedback about parsing results on a number of sentences can be calculated, from time to time.

Problems with the Established Technologies

As language models become more and more complex, many states and transitions have to be simultaneously visualised for some sub-models of the language, with the consequence that in a 2D plane there isn't enough place for all states, and even worse, transitions between states cross frequently each other, resulting in a chaotic visualisation that is difficult to understand visually. On the other hand, due to the lengthy process of recalculating the parse statistics on a representatively large corpus of sentences, the model developer cannot afford to do this after each elementary change to the model. Only after many changes, the modeller can get reliable feedback on the improvement of the models. By consequence, the modeller doesn't know for individual changes whether they brought improvement or deterioration.

Solutions

The systems that are described in this document provide solutions for such problems. For the graphical environment with which the modeller interacts, he can choose to visualise the sub-models in 3D, and interact with them in 3D, so that many more states and transitions can be overviewably visualised. To help the 3D impression, the modeller can also choose to see a 3D animation in time, and interact with it. For the feedback problem, an extremely fast parser is described, that allows practically real-time statistical feedback from large representative corpuses after each individual change has been brought to the language sub-models, which in effect leads the modeller to make much better language models. As by-effect, the extremely fast parser can do extremely fast language processing outside of the language modelling environment too.

II LIST OF FIGURES

FIG. 1 Introduction to 3D visualisation: Parametrising a smooth surface.

Figure 2:
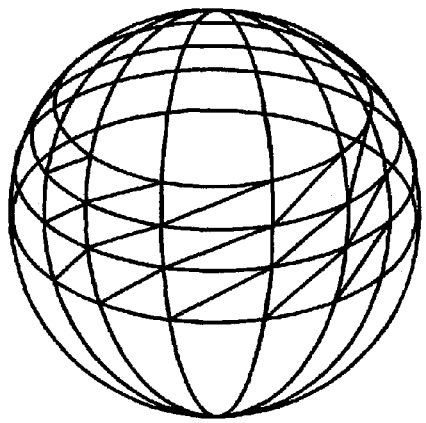

FIG. 2 Introduction to 3D visualisation: Parameter-lines lead to two sets of more or less parallel lines on the surface.

Figure 3:
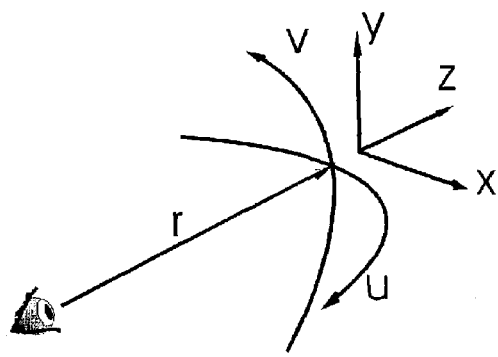

FIG. 3 Introduction to 3D visualisation: How 3D co-ordinates relate to the 2D angular eye viewpoint, plus distance of the point from the eye centre.

Figure 4:
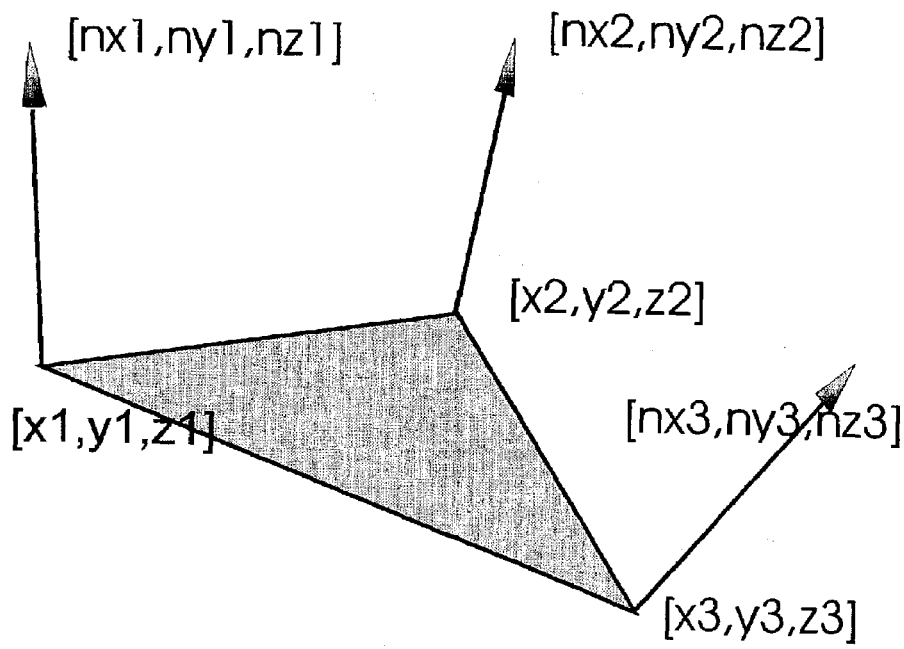

FIG. 4 Introduction to 3D visualisation: How a 3D triangle can be described with the co-ordinates of its three vertices.

Figure 5:
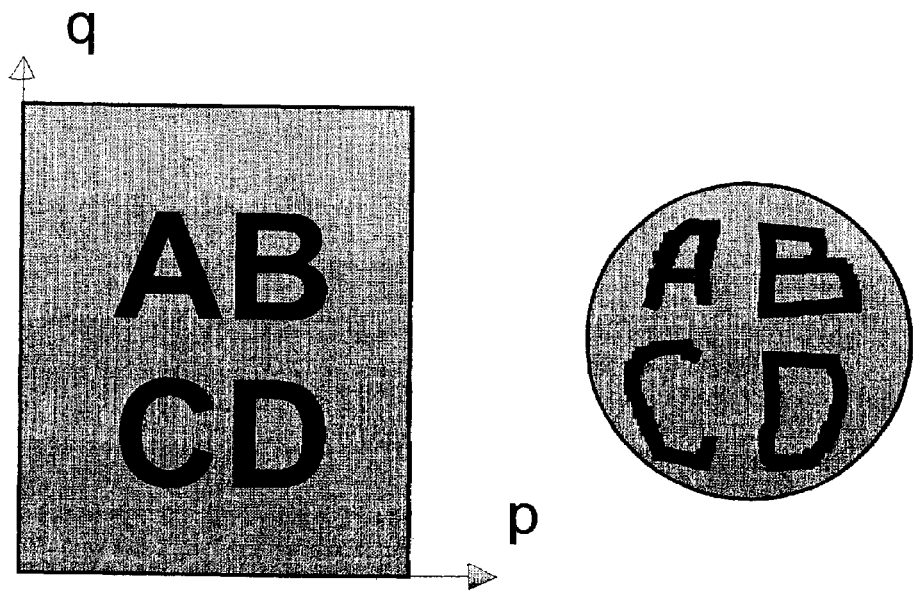

FIG. 5 Introduction to 3D visualisation: To wallpaper the surface, a stretching operation is done from a 2D triangle in a flat bitmap picture to each 3D triangle. In this way, the visualised 3D surface seems to be wallpapered with a flexible picture, that can contain 3D bent text.

Figure 6:
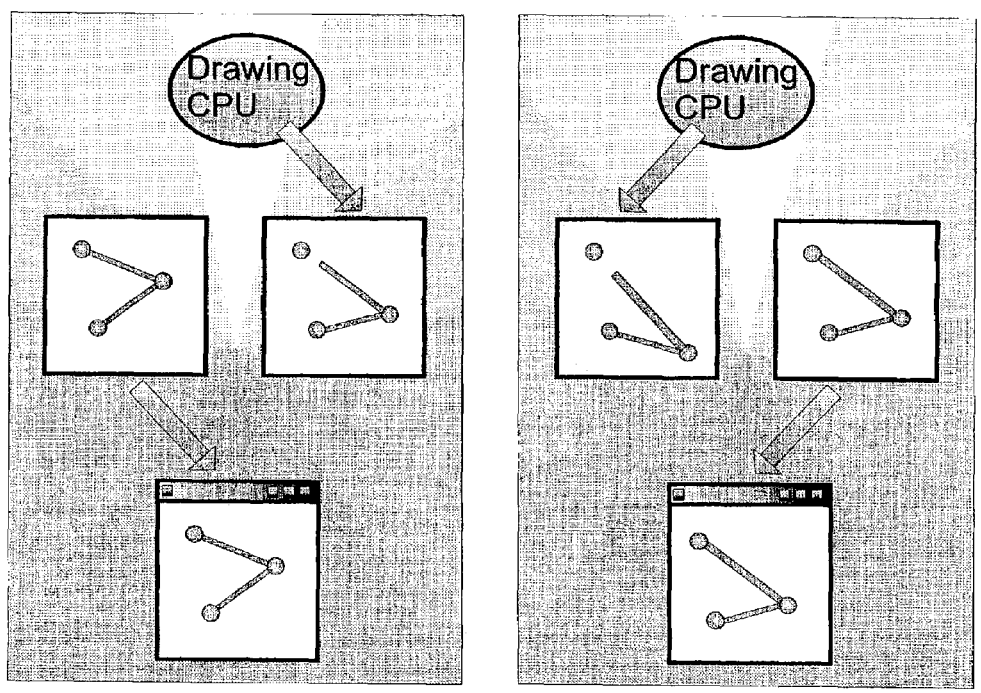

FIG. 6 Introduction to 3D visualisation and animation : repetitively swapping of video memory buffers for drawing and viewing.

Figure 7:
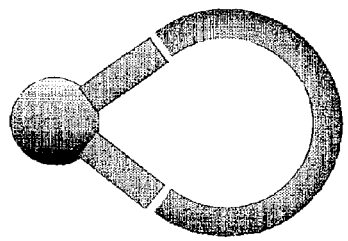
Figure 7:
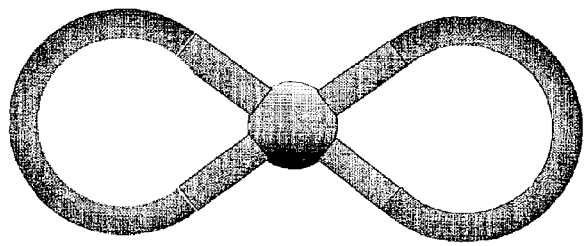
Figure 7:
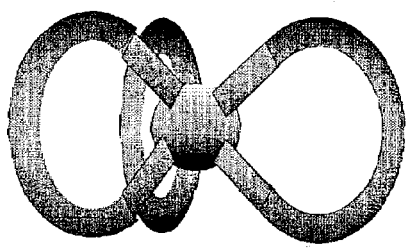

FIG. 7 Examples of shapes to visualise transitions between different states, as is used for natural language modelling.

Figure 8:
Figure 8:
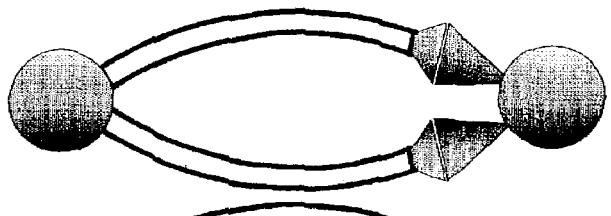
Figure 8:
Figure 8:
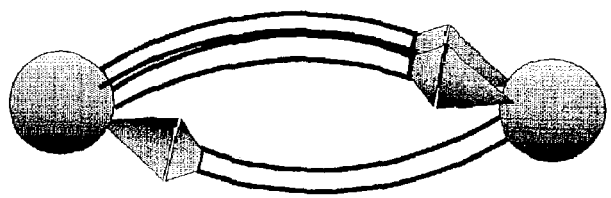

FIG. 8 This figure shows an example of how the non reflexive transitions can be visualised.

Figure 9A:
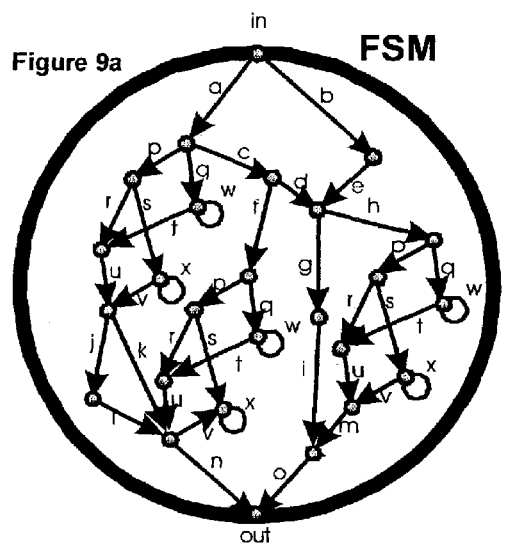
Figure 9B:
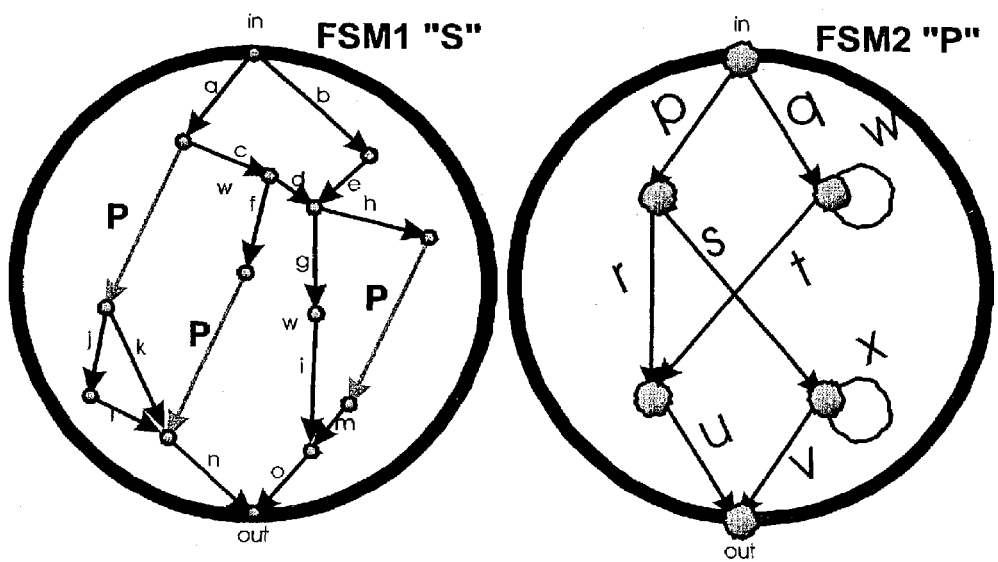

FIG. 9a Introduction to Finite State machines (FSMs):

FIG. 9b Equivalence of a large FSM that includes repeating parts to an RTN composed of several FSMs.

Figure 10A:
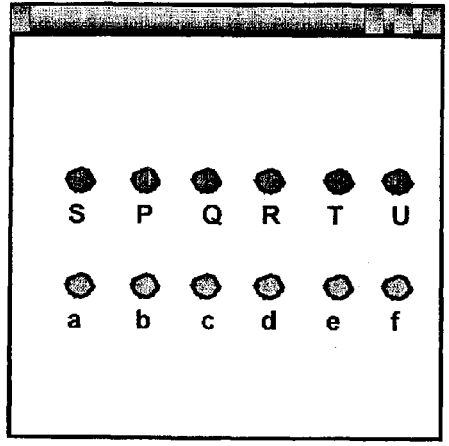

FIG. 10a Overview of an RTN

Figure 10B:
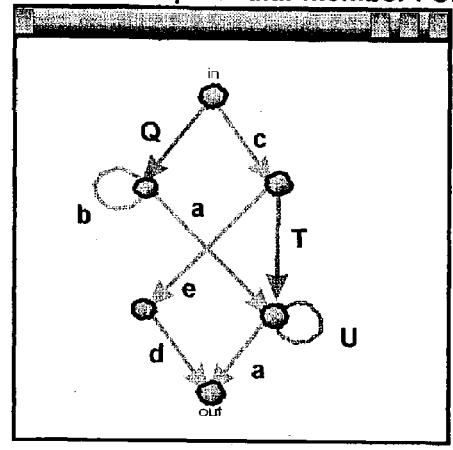

FIG. 10b View of one particular member FSM of that RTN

Figure 10C:
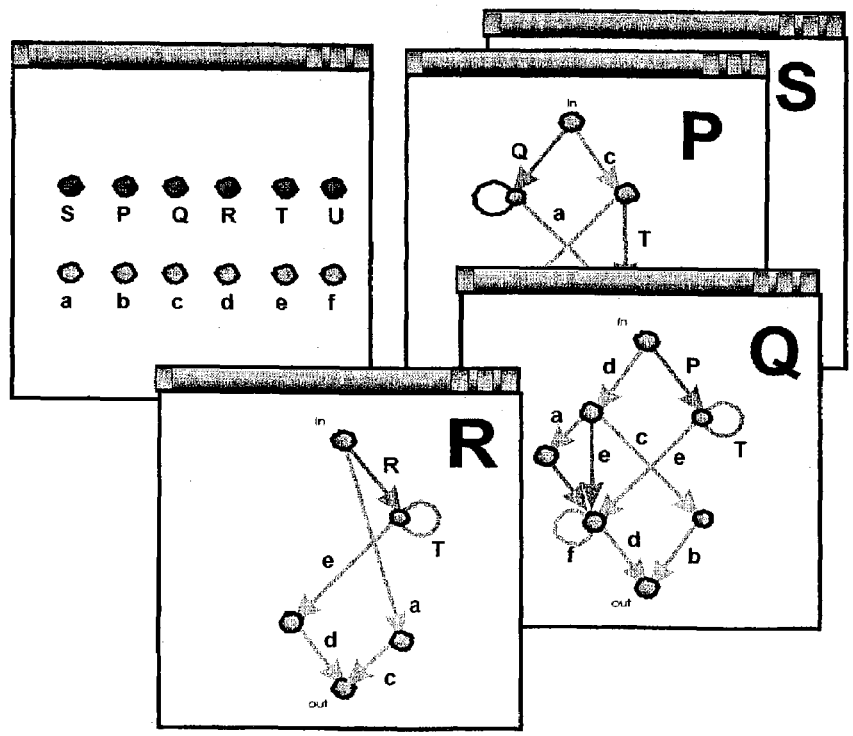

FIG. 10c An RTN overview, plus the internal structure of several of its member FSMs.

Figure 11:
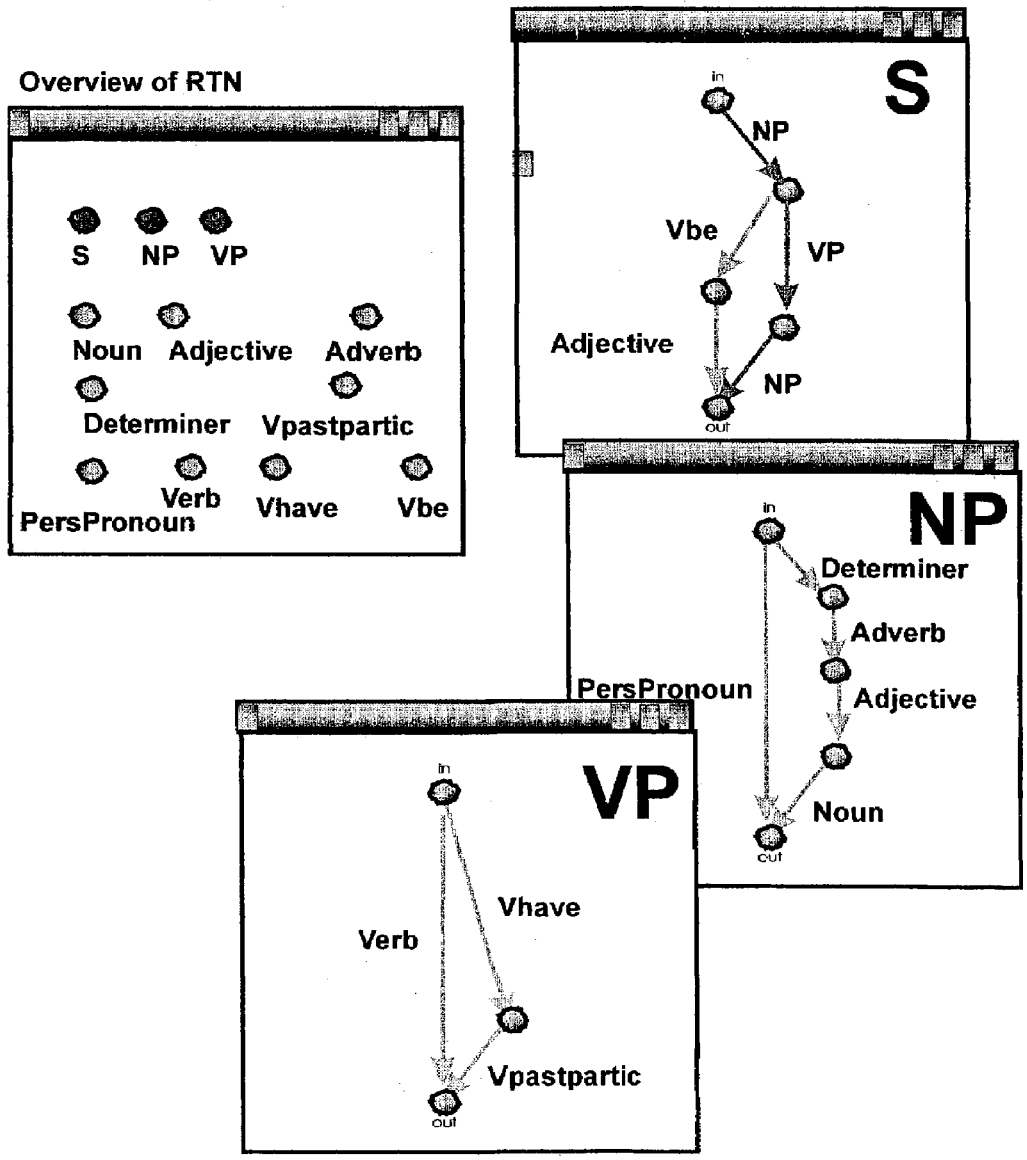

FIG. 11 Example of a simple syntactical RTN

Figure 12A:
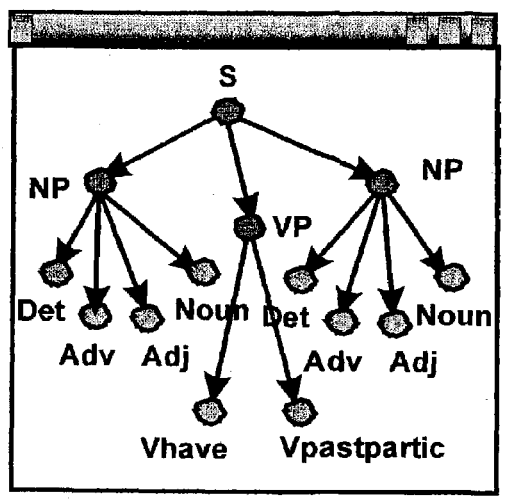

FIG. 12a The representation of a Parse Tree: Example for the example RTN and an example sentence.

Figure 12B:
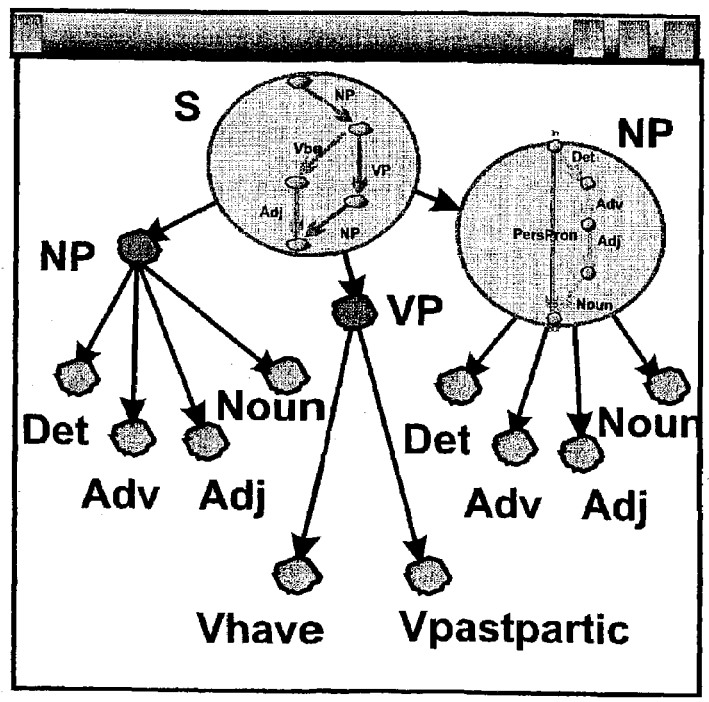

FIG. 12b The inner of procedure nodes in a Parse Tree

Figure 13:
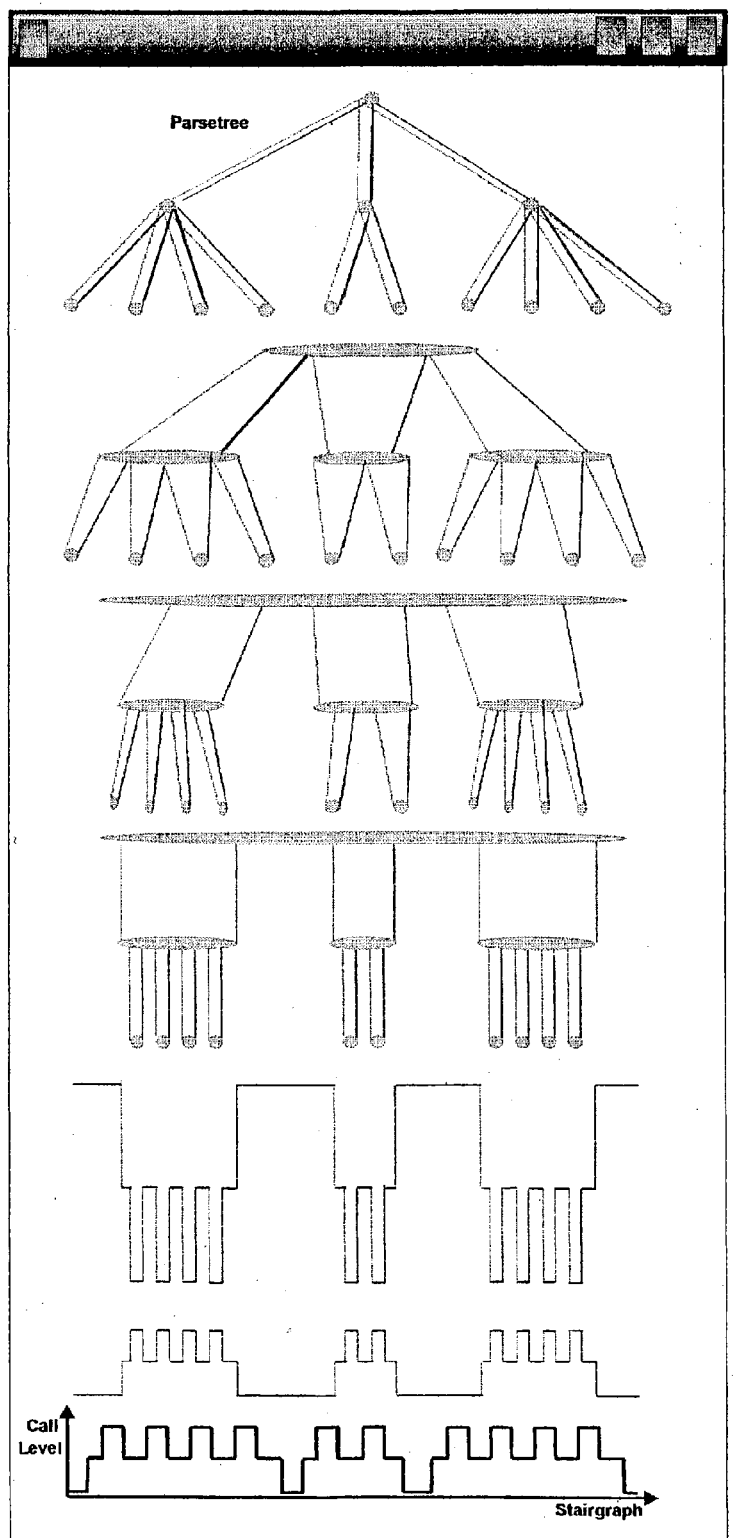

FIG. 13 This figure tries to make clear the correspondence of stairgraphs with parse trees.

Figure 14:
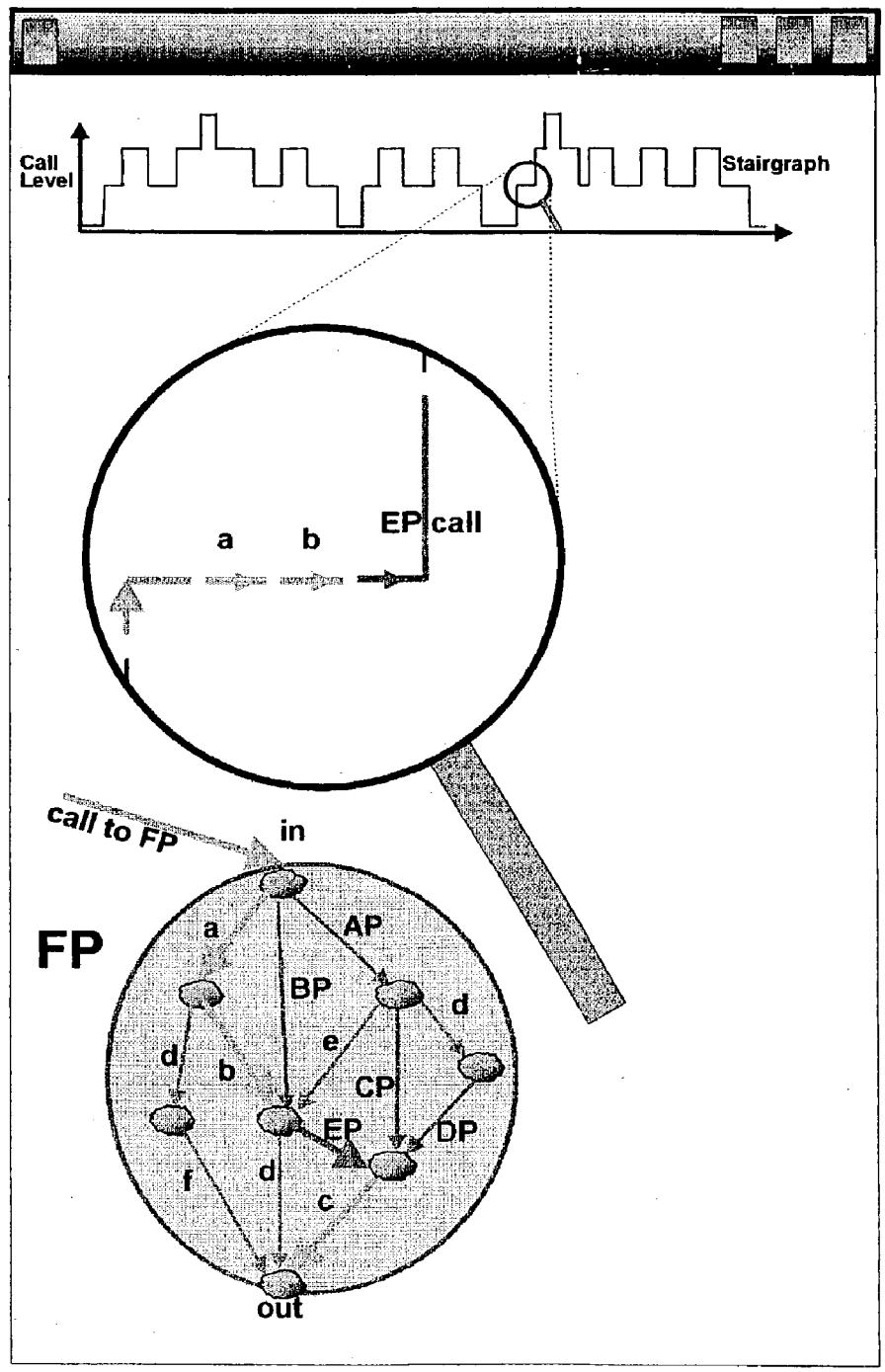

FIG. 14 This figure shows how a piece of stairgraph pathway corresponds with a piece of the path through an FSM.

Figure 15A:
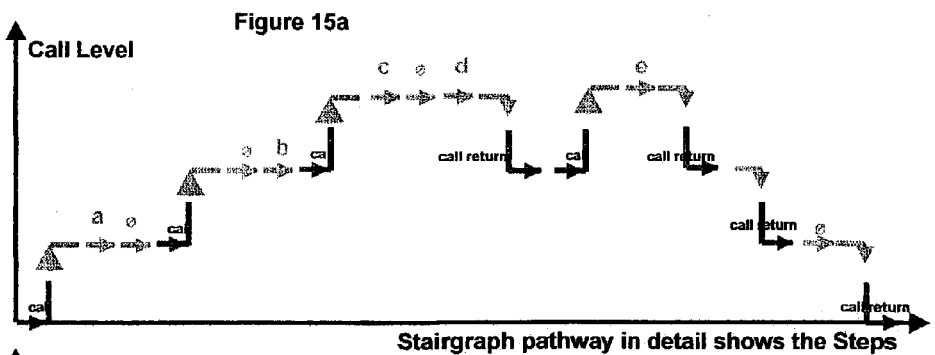

FIG. 15a Stairgraph pathway in detail shows the Steps.

Figure 15B:
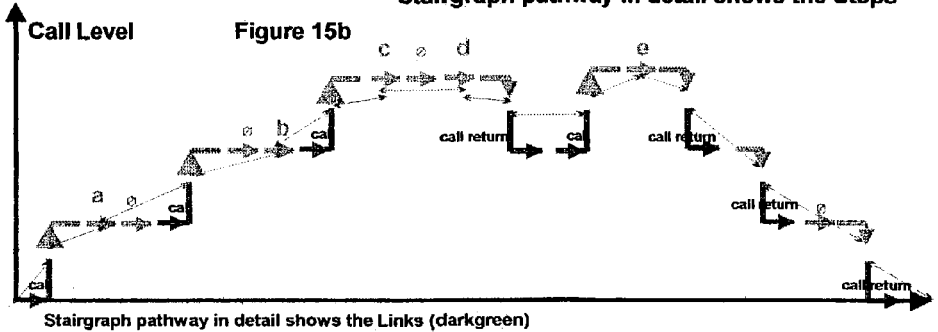

FIG. 15b Stairgraph pathway in detail shows the Links.

Figure 15C:
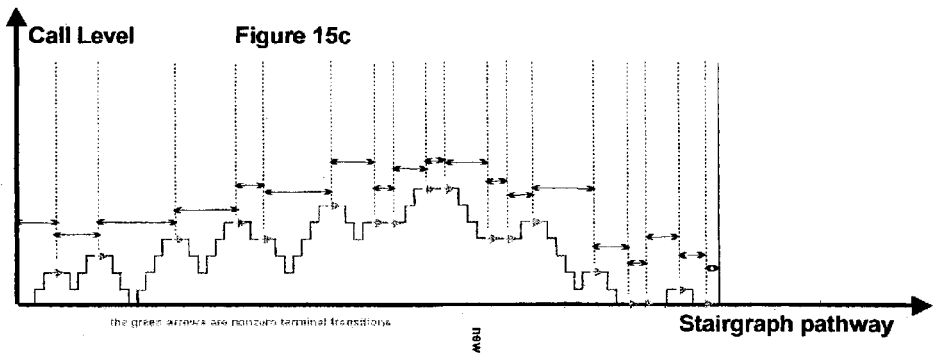

FIG. 15c Stairgraph pathway in detail shows the BiSwings.

Figure 15D:
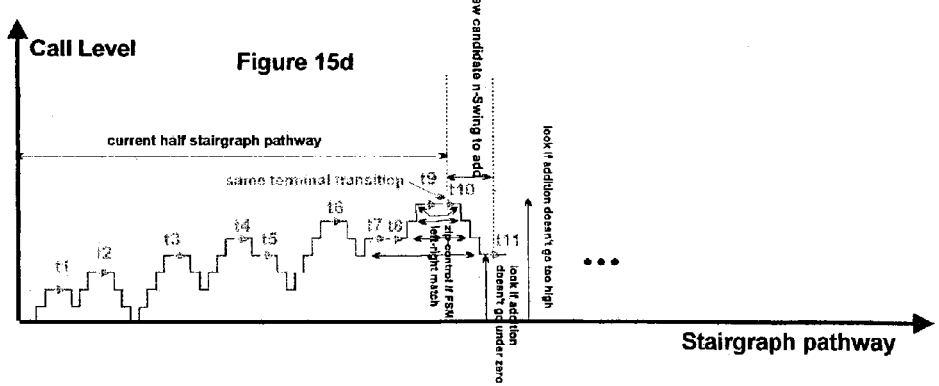

FIG. 15d A legal Stairgraph pathway is being built by concatenating BiSwings

FIG. 16a Tree of (partial) Stairgraphs

FIG. 16b Corresponding left part of Chart

FIG. 16c Example of a simple Parseforest Chart

FIG. 16d Example of a ChartTree representing a Parseforest. Actually the pages should be bent and joined at their sides showing which combinations are possible.

FIG. 17 An algorithm in pseudo code for generating an Alllinks function.

FIG. 18 An algorithm in pseudo code for generating an Allbiswings function.

III DESCRIPTION

III.A Some Relevant Definitions and Acronyms (for Mathematically Precise Definitions, See Further)

Remark: the Terminology Marked with (*) is Used in the Claims

IDE: Integrated development environment: a program-user interface that allows the user to create and modify, save and reopen a set of data (for instance software source files) that belong together (because they interact), AND to 'compile' the data AND see where errors occur during compilation, and to activate the data (in the case of software, this means starting the program).

Example 1: a computer program editor that allows to compile the source code, view the compiler errors on the place they occur, and to run the program, all from within the same view.

Example 2: a database or spreadsheet editor that does control syntax, and allows to do queries and operations while the tables remain visible.

GUI: Graphical user interface: A user interface that is based on a graphical display of objects, and that allows to manipulate those objects by a pointing device, normally a mouse, which can be used to click, drag and draw.

FSM (*): finite state machine (also FSN: finite state network): A mathematical, abstract representation of a system that has only one state at a time, and that can be in a limited number of states. The system can only change states by taking the allowed directed transitions. The FSM can easily be drawn in the same way that in set-theory a relation is drawn in a representation of points within a set and arrows between the points.

State (*): an in principle featureless point in an FSM, from which transition arrows can depart or at which they can arrive. By extension, it's also used when the point has features, like in a parse tree.

Tree or tree structure (*): a figure essentially built from points and lines that represents an unambiguous hierarchy between the points by letting the lines represent parent-child relationships. In a root-up tree-structure, the parent is always in a higher position than its child, and only one point is in the top position, and it's called the 'root', and it's the only point not having a parent. In the context of this patent application, it's used mostly for a parse tree (see further).

By extension it means the abstract hierarchical parental relationship between objects.

Node (*): a point in such a tree structure.

Directed Transition (*): an abstract transition between two states that only allows transition from one state to another, and not necessarily back (except in case of reflexivity).

RTN(*):a recursive transition network. Such a network consists of a set of FSMs with labelled Directed transition, some labelled with other or the same FSM names. Such transitions "call" an FSM. The fact that member FSMs may call themselves directly or indirectly implies that the calling system is recursive. An RTN is an extension of the Context Free Grammar principle, while they remain very similar.

BNF: Backus-Naur Format, (also Backus normal format). A system to specify an RTN by textual rewriting (expansion) rules. For instance:

NP: Det AP Noun
AP: Adv Adj
AP: Adj
PrepP: Prep NP
Terminal (*):
1. a node in a parse tree that doesn't have child nodes. In a syntactical parse tree, it corresponds to a word having a wordclass, or simply a wordclass. In a morphological parse tree, it corresponds to a morpheme having a morphological class, or simply a morphological class.
2. a token in an RTN that isn't an FSM.

Wordclass (*), Part of Speech (PoP) or Wordcategorv: (synonyms) a property of a word that is common to all words that can replace it in almost every sentence, without changing the syntactical structure. Many words have more than one wordclass. Traditional wordclasses for English are: Noun, Adjective, Preposition, Adverb . . . . The wordclass(es) is/are a property of the word itself, independent of the use in a sentence. On he other hand, the sentence can limit the number of possible wordclasses, (if there are more than one) for a particular word.

Morpheme (*): a part of a written word that is not meaningfully divisible further, unless as syllable or individual character. A word can consist of a single morpheme.

Examples: "cat","exist","un-","-ing","-s","a-","pre-"

Morphological class (*): a property of a morpheme that is common to all morphemes that can replace it in almost every word, without changing the morphological structure.

Terminal transition (*): a transition in an FSM, member of an RTN or not, that is labelled with the name of a class (a wordclass/morphological class). Application of this transition to a sequence means that the current position in the sequence while forming a correspondence path, moves one token in the sequence further. An exception is a zero transition (see further).

Procedure transition(*): a transition in an FSM, member of an RTN, that is labelled with the name of an FSM (a word group/morphological group). Application of this transition to a sequence means that the current position in the sequence while forming a correspondence path, moves one group of tokens (wordclass group in the syntactical case) further.

Calling transition:(*): the same as a procedure transition.

Zero transition (*): a special transition in an FSM, member of an RTN or not, that is labelled with Ã, thus not with a class of some kind, best comparable to a Terminal transition, but without associated progress in the sequence. The transition seems unnecessary at first sight, one would think the source and destination states should be unified. But they are very useful to organise FSM transitions in an efficient, compact way.

Reflexive transition(*): a transition in an FSM from a state back to the same state. Such transitions may be taken an indefinite number of times if no other restriction limits this.

ATN: (augmented transition network, Woods 70) an extension of the RTN concept by attaching conditions and actions to transitions. An example can be the checking of gender and number between an adjective and noun. The system also assumes that extra features are added to the lexicon (like for instance the gender of some words).

Parse and Parse Tree (*): parse tree: an abstract tree-structure resulting from applying a language model to a particular sequence (of words or morphemes) that is legal in the model. At the highest level (usually called S in case of a syntactical model, corresponding to the entire sentence), is the grouping of everything. Every next level represents subgroups, each time further split up, until the indivisible elements (words/morphemes) remain. In an RTN based system, the parent-child relationship represents the calling of a child FSM by a parent FSM or the occurrence of a terminal in the parent FSM.

It should be remarked that the hierarchical structure representation of the parse tree doesn't necessarily tell all the details of a parse (which does contain this information).

Parse Forest(*): one particular legal sequence (of words/morphemes) leads possibly to more than one parse, if it is (syntactically/morphologically) ambiguous. Such a set of parses and parse trees is called a parse forest. Ambiguity can be caused by multiple classes (wordclasses/morphological classes) attached in the lexicon to an occurring element, and/or by multiplicity of possible paths through the language model.

Parse tree chart(*): an abstract as well as graphical hierarchically organised tree structure, summarising all parse trees in a parse forest, by unifying all common parts as found by scanning downward from the top of the trees. In the graphical 3D representation, the differences are represented as alternative sub-trees in different z-planes.

Corpus(*): a set of sentences, or by extension, sequences of language elements, that is supposed to be legal in a certain language. Such a set is mostly used to check a model of that language. The modelling gets better the more sentences in the corpus accord to the model. The corpus should thus be a fairly representative collection of sentences of the language to be modelled. The corpus may be intended to model sub-languages, like medical language, judicial language, etc. . . . . The model may allow most sentences in a corpus to be legal, but still be unsatisfactory because it doesn't prohibit legalisation of malformed or completely nonsensical sentences, according to the intuition of the language to be modelled.

This can be summarised as: A language model should be adequate in two ways: as analyser and as generator.

A language model can be used to generate a corpus too. This will be done by randomly taking allowed choices, and specifying a limited number of wanted sentences. The generative adequacy of the model can be judged by looking at this special corpus.

Testcorpus: a corpus to test a model on.

Test Sentences: The sentences of such a corpus.

Control Sentences: the same

Lexicon: a list of words and/or morphemes. In a language model, often each entry is given together with one or more classes.

For instance, the entry "name" has possibility Noun and Verb.

Other features may be mentioned too, like the gender, or maybe purely semantic information.

Legal (*): in accordance to a formal linguistical model, or (sometimes) the intuition of a natural language.

Grammar (*): a rule system that specifies which sequences of elements are legal, normally in a natural or synthetical language context. By extension of this restrictive property, a grammar can equivalently be used as generator of a language.

Formal Grammar(*): a formal rule system that defines such a grammar. The metalanguage in which this is done is either mathematics, a computer readable synthetical language, or a graphical language, as is described here.

Syntactical grammar (*): a grammar that specifies sentence formation based on wordclasses and possibly syntactical features.

Morphological grammar(*): a grammar that specifies word formation based on morpheme classes and possibly morphological features.

Unified grammar: a grammar that specifies word and sentence formation in one unified system.

Hard coded: properties relevant to the user of a computer program that cannot be changed without changing the program itself.

Function (*): (in the software jargon) a functionality unit, sometimes but not always associated with a data object of a certain kind. For instance, if the object is a brush to paint things, setting the colour of the brush is a function associated to the object 'brush', while multiplication is not, as it's absurd to multiply brushes. Another example: for a text object, such a kind of object might have the function "print the text".

A function consists of loops, conditional blocks containing statements that carry out an action of some kind.

Parse Statistics on a testcorpus (*): Statistical data concerning a testcorpus. For instance the number of words per sentence is a variable, for which the average, the variance can be calculated, but also a histogram. While modelling a language, a relevant variable will be for instance the number of parses per sentence.

Instance of an FSM(*): a copy of an FSM in which one particular contiguous path over its transitions is focussed on, and that is usually associated with a certain position in a parse tree. So, two copies of the same FSM can occur in a parse tree, and even if the pathway through each is equal, the instances remain different.

Phrase: in syntactical grammar theory, it is usually a specific wordgroup that belongs together. By refining, phrases can include sub-phrases, which can include sub-phrases etc. . . . . Examples of often defined phrases are NP (noun phrase), VP (verbal phrases), AP (adjective phrase) and so on. The master phrase corresponding to the entire sentence is S.

In the context of RTN and derivatives, they correspond to FSMs.

The root FSM (*): In case of a syntactical grammar, modelled with an RTN or derivative, each legal sentence, represented by a sequence of wordclasses and its usually notified as S. For morphological RTNs, we'll use W. (See also the definition of RTN).

Entry state and Exit state-of an FSM(*): If the FSM itself, or if an RTN, to which the FSM belongs, models the possible sequences of classes in a language, the sequence is legal if a path over contiguous directed transitions is found that starts at the entry state and arrives at the exit state.

Recursive calling(*): see definition of RTN.

Transition condition, action and probability: for models based on RTN extensions, like ATNs, transitions can not only have a label (which is the fundamental transition condition), but also extra conditions on features (like for checking the gender agreement in the French Adjective-Noun subsequence). Also they can have an associated action (which may be a complicated sequence of program-like commands on vaiables). Finally they can have an associated probability, which represents the sentence independent a priori probability that the particular transition is taken from a certain FSM state and not one of the other possible departing transitions from that state. (Such state-leaving probabilities have to add up to unity as it is certain that the state will be left).

Reflexive transitions also can have such probabilities.

In case there is only one transition leaving a state, the probability simply is 1.

Path or Pathway of a Parse(*):

1. path over contiguous directed transitions and calling hierarchy jumps (forward, up one calling level and back) that is associated with a parse.

2. Sequence of subsequent Links (see further), each Link being associated with an instance of an FSM in the given RTN.

Partial and full parses (*): full parse: a parse from the entry state of the root FSM-instance upto the end state of the root FSM-instance. Partial parse: part of such a path in which beginning or ending subsequences are missing. Partial parses are useful to examine when a plausible sentence is illegal according to the present version of the model, and thus can't produce full parses.

Pointing device(*): a computer peripheral device, used normally to move a cursor arrow on the screen and to click on items under that arrow. By extension it may also be a device to be used in a three-dimensional space, e.g. a data glove.

Mouse wheel(*): the little wheel on top of some mouse pointing devices, often used to scroll through a text, independent of the mouse ball movement. Some mice have 2 such wheels.

sequence-chart(*): a directed graph with one start- and one endpoint in chartform that summarises a set of sequences by taking common subsequences together, such that the chart can generate every original sequence in the set, but no sequence more.

to move a pointing device's position(*): can, in case the display unit is in 2D, include movement in a $3^{rd}$ dimension that isn't visible on the display unit, but that is based on rolling a wheel, like for instance available if a wheel mouse is used as pointing device.

Semantic(*): concerning the meaning of language, such elements or rules of a language that aren't traditionally regarded as relevant to a morphological or syntactical system.

Features in linguistics: properties, usually without much structure in their own. For instance: "female", "plural". Semantic features are for instance: "animal","fluid", "action on a material subject". . . .

Editing versus Browsing(*): A data structure like for instance a text, can be the focus of what a program presents to a user. When only browsing is allowed, the user can look at every part of the structure that he wishes to see by using the browsing facilities, but without changing the structure.

When editing is allowed, the user can modify the structure too.

to click on/in something(*): to be understood in a general way in this context: clicking by a user is giving a signal to the system that the user wants the system to derive an elementary instruction from the type of clicking AND the position (on) or area (in) to which the pointing device is pointing. Examples of different types of clicking are pushing keyboard and mouse key combinations (not restrictive) or spoken voice commands.

to drag and drop(*): like clicking but the elementary instruction is related to 2 pointing device positions, defined as the pointing device position when a first signal the dragsignal occurs, and the second position when a later second signal, the dropsignal, occurs. Often, if the position didn't change enough between the two signals, the user action isn't considered as a drag-and-drop but as simple clicking.

point-sensitive user instructions(*): editing and other instructions given by the user in a one or more step process. The first step is always to point in an area on the display unit, and to click or drag in it. Depending on the point and/or area on the display unit that is clicked, or the 2 points or areas between which is dragged, a complete editing instruction is issued, or a menu to click in is presented to the user, and only after the user has clicked his choice from the menu, an editing instruction is complete to be carried out by the system.

stairgraph(*): a 2D graph, with as x-axis, the corresponding progress in the input sequence, and as y-axis, the call-level. It is built up from contiguous short vertical and horizontal line-pieces that show how a partial or full parse or an n-Swing is built from elementary steps, the horizontal line-pieces representing terminal transitions or zero transitions, the vertical line-pieces representing the calling (upgoing direction) of an FSM from within another or the same FSM and the returning (downgoing) from that second FSM back to the first one. Such calls can be nested. For a full parse, the base line is known and is by convention call-level 0. The stairgraph always can go up one unit, thus one call level, or go down one unit at a time. A full parse begins and ends on call-level 0, and never can go below the base line.

In a partial stairgraph, the baseline can be unknown, but still, every upgoing call from FSMa to FSMb should have at the right side, on the same level, either nothing, or a downgoing return from FSMb back to FSMa.

A (piece of a) stairgraph is essentially the same as a (piece of a) parse tree, as is illustrated in FIG. 13.

call-level(*): (see also definition of stairgraph) The absolute or relative height of a horizontal line-piece in the stairgraph.

subsequent transitions in an FSM(*): a sequence of transitions in an FSM in which for every pair of neighbouring transitions holds that the first transition arrives at the same state from which the second transition departs.

Link(*): a sequence, which can't be longer than a predetermined maximum, of at least two subsequent transitions within an FSM, that only can begin at the entry state or end at the exit state of the FSM, or begin or end with a procedure transition, or with a nonzero-terminal transition, and that only can have zero-transitions in between.

Link Types and their number(*): Depending on properties of the first transition and of the last transition in its sequence, 8 types can be distinguished:
1. Starting from a nonzero terminal transition and ending on a nonzero terminal transition on the same call-level, thus never leaving the FSM instance. This link is represented in a stairgraph as a flat line-piece—.
2. Starting from a nonzero terminal transition and ending on a procedure transition calling another FSM instance. This other instance can, as always, be an instance of another FSM or of the same FSM. This link is represented in a stairgraph as ⌡. This link increases the call-level.
3. Starting from a nonzero terminal transition and ending at the exit state of an FSM, ready to go back to another calling FSM instance. This link is represented in a stairgraph as ⌐.
4. Starting at a calling transition and ending in a nonzero terminal transition. This link is represented in a stairgraph as ⌊
5. Starting at a calling transition and ending in another or the same calling transition. (these pieces are at the bottom of the BiSwing valley, see further). This link is represented in a stairgraph as ⌊⌋
6. Starting a calling transition and ending at the endstate of the FSM, ready to go back to another calling FSM instance. This link is represented in a stairgraph as ⌊⌐.
7. Starting at the entry state of the FSM after this FSM was called from another FSM instance, and ending in a nonzero terminal transition. This link is represented in a stairgraph as ⌈.
8. Starting at the entry state of the FSM after this FSM was called from another FSM, and ending on a transition calling another FSM instance. This link is represented in a stairgraph as ⌈⌉.

a calling link: a link of type 2, 5 or 8.

a returning link: a link of type 4, 5 or 6 a flat link: a link of type 1 subsequent Links in an RTN(*): a sequence, which can't be longer than a predetermined maximum, of one or more Links that belong an FSM of the RTN, in which for every pair of neighbouring Links holds that:

if the first Link is a calling Link, the second must be a link of type 7 or 8, and the last transition of the first Link must be a call to the FSM to which the second Link belongs.

if the second link is a returning link, its first transition must be a calling transition to the FSM to which the first Link belongs, and the first Link must be of type 3 or 6.

if the first Link is of type 1, 4 or 7 and thus ends on a nonzero terminal transition, the second link must belong to the same FSM and it must be of type 1, 2 or 3, and must have as first transition the same as the last one of the first Link.

BiSwing(*): a sequence of subsequent Links, in which only the first one can and must start with a nonzero terminal transition, and only the last one can and must end on a nonzero terminal transition.

A natural way to subdivide all possible BiSwings for a given RTN, is to make subsets according to ordered pairs of tokens, or more specifically language elements, which are pairs of wordclasses in the syntactical case for instance.

n-Swing(*): a sequence of subsequent Links, in which the first one can and must start with a nonzero terminal transition, and the last one can and must end on a nonzero terminal transition, and in which only n−1 Links, in total, can start with a nonzero terminal transition.

A natural way to subdivide all possible n-Swings for a given RTN and n>1, is to make subsets according to ordered n-tupples of tokens, or more specifically language elements, which are n-tupples of wordclasses in the syntactical case for instance.

Matching and Joining an n-Swing on the Left With an n'-Swing on the Right to an (n+n')-Swing by Matching Their Stairgraphs(*):

1) Checking if the last transition of the last Link of the n-Swing is equal to the first transition of the first Link of the second n'-Swing.
2) joining both their stairgraphs together to a unified stairgraph candidate by vertical shifting until this equal transition is in both on the same call-level and by unifying this equal transition to a single occurrence.
3) Each time an upgoing and downgoing line-piece (representing a calling and returning transition) on the same call-level are left and right closest neighbours, thus no other line-pieces in between at the same call-level, they should obey the rule that upgoing FSMa→FSMb matches downgoing FSMb→FSMa. If this is not the case, there's no match.
4) If the base level is known in one of the n-Swings, and the joined candidate (n+n')-Swing goes below call-level 0, there's no match.
5) Matching n-Swings are joined together by appending the sequence of Links of the second n-Swing to the sequence of the first n-Swing.

Call level Span of an n-Swing: the level difference between the highest call level and the lowest call level in the corresponding stairgraph.

An n-Swing matching an sequence of n language elements (*): the n-Swing matches the sequence of n language elements, thus an n-tupple of nonzero terminals, if the same sequence of nonzero terminals can be made by starting from an empty sequence and scanning the array of Links in the n-Swing from first to last and adding a nonzero terminal to the sequence, obtained each time a Link starts with an nonzero terminal transition from this terminal.

IIIB Mathematical Precise Definition of an FSM, an RTN and of Parsing as Used in the Present Text 1. Token Sequence:

Let's assume that T is a set of n arbitrary elements $\{t_1, \ldots, t_q\}$, which we call 'tokens'. T is then called the 'token set'. If q is finite, T is called a finite token set.

A token sequence from T of length p is an element of T×T . . . ×T (p times), generally notified as $(t_{a1}, t_{a2}, \ldots, t_{ap})$.

The set of all possible token sequences of length p is notified as $S_p(T)$, so $S_p$=T×T×T . . . ×T (p times), which can also be written as $S_p(T)=T^p$.

The set of all possible token sequences from T, notified as S(T) is then $S(T)=S_2(T) \cup S_3(T) \cup S_4(T) \cup S_5(T) \ldots$ (infinitely)

Examples of elements of S(T) are $(t_4,t_{12},t_{12},t_7,t_8)$, $(t_8,t_9)$, etc . . . (in the assumption that q>=12)

Remark that a token sequence from T can be of infinite length, even if T is finite.

2. Directed Graph

Let's assume that N is a set of r arbitrary elements $\{n_1, \ldots, n_r\}$, which we call states or vertices (the 3 names are synonymous). We will call them here 'states', in accordance with the terminology of a finite state machine (see further).

Let's assume that E is a set of u arbitrary elements $\{e_1, \ldots, eu\}$, which we will call edges or transitions (why will become clear further on). Both are again synonymous, but we will use transition.

Let's assume there exists a mapping M: E→N×N, so that for each transition e∈E, a couple $(n_i, n_j) \in N \times N$ is given by the mapping.

For such a transition e, $n_i$ is called the departure state and $n_j$ is called the arrival state.

A directed graph is then defined as any set {N,E,M}, of such sets that fulfils the previous requirements and, moreover, in which N, E and M are finite.

We notify the set of all possible directed graphs that can be defined on N as G(N).

Remark that defining the graph using the mapping, allows to have more than one transition from a given $n_i$ to a given $n_j$ within a graph.

3. Finite State Machine

We define a labelled directed graph on a given set N from T as the set {N,E,M,T,L}, in which {N,E,M} is a directed graph on N, and in which there exists an additional mapping L: E→T, so that for each transition e∈E, a token $t_i \in T$ is given by the mapping.

(T is thus regarded as the token set, in the sense of the above context of a token sequence).

It is also assumed now that T is finite.

Exactly one element n1 ∈N has to be chosen among the states of N and is called the entry state.

We define the first order follower set of a state $n_i$ as the set of all $n_j$'s for which an e∈E exists that is mapped to $(n_i, n_j)$ We define the first order follower set of a subset K of N as the union of all first order follower sets of the states in the subset K.

We define the second order follower set of a subset K of N as the first order follower set of the first order follower set of the subset K.

We define the v+1th order follower set of a subset K of N as the first order follower set of the vth order follower set of the subset K.

We define a directed graph as being contiguous, if for each state $n_i$ ∈N there exists at least one finite v such that $n_i$ belongs to the vth order follower set of $\{n_1\}$ (which is the subset of N that only contains the entry state).

We define a finite state machine as the set $\{N,E,M,T,L,n_1\}$, in which {N,E,M} is a finite contiguous directed graph, and in which {N,E,M,T,L} is a labelled directed graph on the given set N from a finite token set T.

Some synonyms for finite state machines: finite state automata, finite state networks. The precise original definition in literature may vary a bit but in essence they stand for the same. We will use the acronym FSM.

We define a finite state machine with an exit state as the set $\{N,E,M,T,L,n_1,n_2\}$, in which $\{N,E,M,T,L,n_1\}$ is a finite state machine and $n_2 \in N$ is an almost freely chosen state that we call the exit state of the finite state machine. We only demand that n1≠n2

We define the first order precursor set of a state $n_j$ as the set of all $n_i$'s for which an e∈E exists that is mapped to $(n_i, n_j)$ We define the first order precursor set of a subset K of N as the union of all first order precursor sets of the states in the subset K.

We define the second order precursor set of a subset K of N as the first order precursor set of the first order precursor set of the subset K.

We define the v+1th order precursor set of a subset K of N as the first order precursor set of the vth order precursor set of the subset K.

We define a finite state machine with an exit state as being well formed, if for each state $n_i$ c N there exists at least one finite v such that $n_i$ belongs to the vth order precursor set of $\{n_2\}$ (which is the subset of N that only contains the exit state).

We define a finite state machine with an exit state as being cyclic, if either the vth order follower set of $\{n_1\}$ or the vth order precursor set of $\{n_2\}$ remains not empty for any (large) value of v.

for each state $n_i \in N$ there exists at least one finite v such that $n_i$ belongs to the vth order precursor set of $\{n_2\}$ (which is the subset of N that only contains the exit state).

4. Legal Token Sequence With Respect to an FSM

A transition sequence with respect to an FSM is defined as an $(e_1, e_2, \ldots, e_p) \in E^p$ if for any $i=1,2,\ldots,p-1$ the arrival state of $e_i$ equals the departure state of $e_{i+1}$.

A transition path through an FSM is defined as a transition sequence $(e_1, e_2, \ldots, e_p)$ for which the departure state of $e_1$ is $n_1$, the entry state of the FSM.

Among the set of all possible token sequences from T, notified as S(T), only some are called legal within the framework of an FSM with entry and exit state.

A token sequence $(t_{a1}, t_{a2}, \ldots, t_{ap})$ is called legal with respect to an FSM if for any ith sequence element on the ith place in the token sequence, an ei, a transition thus, can be found in E that maps to a $(n_x, n_y)$ of N×N.

(For such a transition $n_x$ is of course the departure state and $n_y$ the arrival state.)

(The sequence of tokens is turned into a sequence of transitions, for which we may have some freedom to choose)

and if for the found/chosen transition sequence the following is true: for any two $t_{a\,i}, t_{a\,i+1}$ that directly follow each other in the token sequence, the arrival state corresponding with $t_{ai}$ is equal to the departure state corresponding with $t_{a\,i+1}$.

And if for the first sequence element $t_{ai}$, an $e_i$, a transition thus, can be found in E that maps to a $(n_x, n_y)$ of N×N in which $n_x$ is $n_1$, the entry state of the FSM.

And if for the last sequence element $t_{ap}$, an $e_i$, a transition thus, can be found in E that maps to a $(n_x, n_y)$ of N×N in which $n_y$ is $n_2$, the exit state of the FSM.

Important remark to keep in mind: given a certain legal token sequence wrt a given FSM, there may well be more choices for transition ei in E mapping to $(n_x, n_y)$ of N×N. This comes down to the fact that different pathways through the FSM may be associated with the same token sequence. See further in 'Parsing ambiguity causes'.

5. Recursive Transition Network

We define a recursive transition network as the set $\{FSM_0, \{FSM_1, \ldots, FSM_w\}\}$, in which w is finite and w>1, and all $FSM_i$'s are well formed finite state machines with an exit state, with only T in common, so $FSM_i = \{N_i, E_i, M_i, T, L_i, n_{i1}, n_{i2}\}$, and in which $\{FSM_0, FSM_1, \ldots, FSM_w\} \subset T$ and w<q.

The special FSM $FSM_0$ is called the root FSM.

All the FSMs $FSM_0, FSM_1, \ldots, FSM_w$ are said to belong to the RTN.

The set of tokens may include a so called zero token, a unique token in T. Later we'll show its use.

6. Replacement by Calling Principle With Respect to an RTN

A legal token sequence $(t_{a1}, t_{a2}, \ldots, t_{ai}, \ldots, t_{ap})$ wrt a certain $FSM_1$, belonging to an RTN can be legally expanded into another token sequence $(t_{ai}, t_{a2}, \ldots, t_{b1}, \ldots, t_{bp'}, \ldots, t_{ap})$, which is not necessary legal wrt $FSM_1$, by replacing the token $t_{ai}$ in it, by the elements of the legal token sequence $(t_{b1}, t_{b2}, \ldots, t_{bp'})$ wrt a certain $FSM_2$, which also belongs to the same RTN, but only if $t_{ai}$ equals $FSM_2$ (a token can be an FSM!). This replacement is referred to as "$FSM_1$ is calling $FSM_2$".

This process can be repeated in two ways:

Horizontal expansions: (same level)

$FSM_1$ can call $FSM_2$ but also $FSM_3$ by replacing a certain $t_{aj}$ too by the legal token sequence $(t_{c1}, t_{c2}, \ldots, t_{cp''})$ wrt a certain $FSM_2$, yielding $(t_{ai}, t_{a2}, \ldots, t_{b1}, \ldots, t_{bp'}, \ldots, t_{c1}, \ldots, t_{cp''}, \ldots, t_{ap})$, and $FSM_1$ can call an $FSM_4$ as well, etc . . . , as long as there are tokens enough in the original token sequence that are FSMs and thus can be replaced.

Vertical Expansions: (Ever Deeper Levels)

$FSM_1$ can call $FSM_2$ but $FSM_2$ can first have called an $FSM_3$ by replacing a certain $t_{bj}$ in its legal token sequence $(t_{b1}, t_{b2}, \ldots, t_{bj}, \ldots, t_{bp'})$ by the legal token sequence $(t_{c1}, t_{c2}, \ldots, t_{cp''})$, which first resulted in $(t_{b1}, t_{b2}, \ldots, t_{c1}, t_{c2}, \ldots, t_{cp''}, \ldots, t_{bp'})$, and now results in $(t_{ai}, t_{a2}, \ldots, t_{b1}, t_{b2}, \ldots, t_{c1}, t_{c2}, \ldots, t_{cp''}, \ldots, t_{bp'}, \ldots, t_{ap})$ Remark the embedding. This embedding can further expand an originally legal token sequence by in principle endless embedding.

Remark that $FSM_1$ can call itself also indirectly, for instance by calling $FSM_2$ that has called $FSM_1$.

Above, we assumed bottom-up vertical expansion, i.e. "$FSM_1$ can call $FSM_2$ but $FSM_2$ can first have called an $FSM_3$", but in fact this order is irrelevant as the result is the same. S, expansion can be done top-down as well.

Combining and repeating both kinds of expansions of an originally legal token sequence wrt a certain FSM, member of an RTN, can be visualised as a tree structure, with the FSM as root. Normally this will be done for $FSM_0$, the root FSM, which explains its name.

7. Legal Token Sequence With Respect to an RTN

Among the set of all possible token sequences from T, notified as S(T), only some are called legal within the framework of an RTN.

A token sequence $(t_{ai}, t_{a2}, \ldots, t_{ap})$ is called legal with respect to an RTN if it can be constructed from a legal token sequence with respect to the root FSM $FSM_0$, by adapting 0,1, or more times the replacement principle, in both the horizontal and the vertical directions, at every possible and chosen level, and finally, by removing all zero tokens in the expanded sequence.

8. A Parsable Token Sequence With Respect to an RTN

A parsable token sequence with respect to an RTN is a legal token sequence wrt an RTN, if in its token sequence only tokens of T occur that are not FSMs in their own, and if its length is finite.

A procedure parse tree node wrt an RTN is a set $\{FSM_i, (T_j, T_k, \ldots, T_z), u\}$, in which $FSM_i$, is an FSM belonging to the RTN, and $T_j, T_k, \ldots, T_z \in T \setminus \{\text{zero token}\}$ (thus tokens that may be FSMs as well, but not the zero token), and there must exist a (non-expanded) legal token sequence wrt FSMi that includes $T_j, T_k, \ldots, T_z$ in the same order, by letting out all tokens that are not also FSMs belonging to the RTN. The last element in the set is u, an index that makes difference between several occurrences of otherwise equal parse tree nodes A terminal parse tree node wrt an RTN is a set $\{T_i,v\}$ in which $T_i \in T\setminus\{\text{zero token}\}$ that is nor a zero token nor an FSM belonging to the RTN, and in which v is an index that makes difference between several occurrences of otherwise equal parse tree nodes.

Expanding a parse tree node $\{FSM_i,(T_j, T_k, \ldots, T_m, \ldots, T_z)\}$, can be done by replacing any $T_m$ in it, that is an FSM, by a valid corresponding procedure parse tree node $\{T_m,(T'_j,T'_k, \ldots, T'_z)\}$, which yields $\{FSM_i,(T_j, T_k, \ldots, \{T_m,(T'_j,T'_k, \ldots, T'_z)\}, \ldots, T_z)\}$, or by replacing any $T_m$ in I that isn't an FSM by a corresponding terminal parse tree node, yielding then $\{FSM_i,(T_j, T_k, \ldots, \{T_m,v\}, \ldots, T_z)\}$.

The expansion means that the first parse tree node becomes the parent of the second parse tree node, while the second parse tree node is the child of first parse tree node.

Again, this expanding system can be repeated horizontally and vertically, until a finite structure is found that only is written with terminal parse tree nodes at its deepest levels (in other words, no further expansion in either direction is possible).

Different children of the same parent parse tree node are then sibling parse tree nodes.

A parse tree structure is a defined as the result of repeatedly expanding a procedure parse tree node until all procedure parse tree nodes are expanded. As there is in general some choice possible during the repeated expansion, the expansion may or may not be a finite process. If the result is finite, the parse tree structure is said to be finite.

In such a parse tree structure, the first component of a parse tree node remains in place during each expansion step, and this allows to keep parent, child and sibling relationships during the expansion.

A bare parse of a parsable token sequence wrt an RTN is a finite parse tree structure with as root $FSM_0$, and for which the expansion process precisely corresponds to the expansion of which the parsable token sequence is the result: Each expansion step of the token sequence, referred to as $FSM_i$ calls $FSM_j$, is associated with the expansion of a procedure parse tree node's $T_m$ into a new parse tree node $\{T_m,(T'_j,T'_k, \ldots, T'_z)\}$ which is child of $T_m$.

A parse of a parsable token sequence wrt an RTN is in general a bare parse, but with extra information added, especially about particular pathways over the states within each FSM, as ambiguity can result from not knowing this pathway information too.

9. Parsing and Parser

The parsing process is defined as the inverse process of expanding a legal token sequence wrt an RTN, thus:
Given an certain RTN,
given a legal or illegal token sequence wrt that RTN,
find out how expansions could have built the given token sequence,
and keep track of the building process in the parse tree structure The system that executes the parsing process is called the parser, which may be a fully theoretical system as well as a software module on a computer.

In general, there may be several solutions to the parsing process, or one or none. If there are none found, we must conclude that the token sequence is illegal wrt that RTN.

When a parsing process is implemented in a computer program, which isn't always a perfect implementation of the parsing process, the correct number of parses may not be found because of limitations on memory and calculation time of various kinds have been added.

In this text we assume that a parser is capable of finding all solutions, unless otherwise mentioned.

10. Language Parsing and Language Ambiguity

If there are several solutions, we call the token sequence ambiguous wrt the RTN.

A subclass of all RTNs are deterministic RTNs. They are defined as RTNs, for which a parsing process can only find exactly one solution for each legal token sequence wrt the RTN.

If we know that an RTN is deterministic, we can use a subclass of all parsers, called deterministic parsers. Examples of deterministic RTNs ly at the base of many computer languages (which are synthetic languages). Natural languages, as people evolved them, are ambiguous, and one of the reason for that is that often the syntactical system is more or less based on ambiguous RTNs.

For syntactical use of RTNs, the word classes (aka parts of speech) normally are the terminal tokens, while the procedure tokens correspond to word groups belonging together. The zero token has no natural equivalent, and is in essence useful to model languages in a compact and elegant way. The token sequences are not the sentences of a language themselves but closely related: each word is replaced by its part of speech.

Designing a particular RTN can be considered as a simple framework to try to model a language.

Four remarks:
1. Natural Language is vastly more complex than any RTN.
2. Major aspects of natural language analysis are not compatible with the RTN formalism.
3. The RTN system appears to be one of the most powerful ordering systems to model syntactical aspects of many natural languages.
4. The RTN system shouldn't be regarded as only applicable for natural or synthetic languages, but appears to be omnipresent in the way humans understand and interact with their environment.

11. Parsing Ambiguity Causes

When an FSM calls another FSM, a token is replaced with an arbitrary legal token sequence wrt the second FSM. This doesn't necessarily mean that in the reversed process (parsing), when a certain expanded token sequence is started from, this arbitrary choice also exists.

It does, but to a lesser degree, as the approved expansions must result ultimately in the given terminal sequence. This is a strong limitation, but different pathways within the called FSMs, may cause a different tree structure for the same input sequence.

Even if the tree structure cannot be different (no other bare parses found), the pathway within an FSM may be different. An example of a natural language sentence in Dutch that causes such ambiguity is:
De baron zoekt de butler Interpretation1: "the baron is looking for the butler".
This could be the answer to the question:
"Who is the baron looking for?"
Interpretation1: "the butler is looking for the baron".
This could be the answer to the question:
"Who is the butler looking for?"

In natural spoken language, this ambiguity would be resolved by taking into account stress and intonation.

The ambiguity in the RTN follows from the fact that the token sequence (NP, Verb, NP) would be present twice (as pathway between different states) in the $FSM_0$. Once with the first NP as subject and the second as direct object and once the other way around.

In this example NP stands for noun phrase (another FSM), and Verb for a terminal token.

For language parsing, further ambiguities may stem from morphological ambiguities, and for mostly, from semantic or pragmatic ambiguities, but these have nothing to do with the syntactical RTN and its parsing system.

12. RTN Parsing by Straightforward Backtracking.

How can parsing be done in practice? Here we look at the obvious way.

We have to assume we have a certain RTN, and each time a legal or illegal token sequence wrt that RTN, is presented to the parsing system, a parsing result is generated.

Typically, the RTN remains the same, while many token sequence each time lead to a parsing result.

During the parsing process of such a token sequence, each time, copies are made of the FSMs of the RTN, as they are required while parsing (see further). Initially only one copy of the root FSM is required. Later on, there may be several copies around of the same FSMs. We will call such copies "instances". Such instances are created and deleted during the parsing, so that only an instance of the root FSM remains by the end of the parsing of one token sequence.

The reason why we need copies is that we don't want to 'dirten' the original FSMs by keeping track of paths that pass over the states by jumping along directed transitions. The reason that we may need several copies is that each copy has a different pre-history (including from where the FSM was called, and at which level of recursion etc . . . ), which makes sense as the paths within an FSM can be considered as part of a larger path, which can be in turn be considered as the history of the path.

We assume that all the transitions in an FSM belonging to an RTN are ordered, and that this ordering doesn't change during the parsing process. From this follows that the transitions departing from any state of an FSM belonging to the RTN are ordered too. By consequence, we can speak about the first transition departing from a state in the FSM, the next transition after a previous transition, and the last transition departing from that state.

Let's define a 'tick' as the indivisible time unit that increases while parsing proceeds.

Let's also define 2 kinds of synchronised 'pointers', which both can move during the parsing process.

One kind is always pointing at a place in between two tokens of the given token sequence, or before the first or after the last token. Let's call such pointers "sequence pointers". Such pointers can 'jump' forward or backward by moving one word further, or back, thus one word at a time (multiple of a tick).

Such a Sequence pointer is mathematically defined as $P_i(t)=\{s,i\}$ with $s \in S_p(T)$, a string of $p$ tokens, and $i=0, 1, \ldots, p$.

The other kind of pointer is pointing (at least) to a certain state in an instance of one of the FSMs comprising the RTN. Within the FSM-instance, such a pointer always points to a state. So, we'll call them "state pointers". State pointers are able to "move" the state they point to, except if they are in so called waiting mode. In this special mode, they point to another FSM-instance too (of the same FSM or another) and to a transition e that departs from the state to which the pointer points and that maps to a token that's precisely this second FSM-instance.

Such a State pointer is mathematically defined as $P_{ij}(t)=\{FSM_i,j,n_k,u\}$ with $FSM_i$, belonging to the RTN, j the instance number, and $n_k$ a state of $FSM_i$.

if the State pointer is in moving mode, $u=\{e\}$, in which $e \in E$ and $M(e)=(n_k,n_x)$, in other words the transition e departs from $n_k$., if it is in waiting mode, $u=\{FSM_{i'},j',e\}$, in which $L(e)=FSM_{i'},j'$ an instance number for $FSM_{i'}$ and $M(e)=(n_k, n_x)$, in other words the transition departs from $n_k$. In less precise words, this means that the pointer keeps track of the transition that causes a call to a new instance of $FSM_{i'}$, to know where the path continues when the call returns, which is at the other side of this calling transition.

For $P_{ij}(t)$, the transition e is called the considered transition.

The complete situation at any moment t during the parsing process is given by

Situation($t$)=$\{RTN,s,P_i(t),I_0(t),I_1(t),\ldots,I_w(t)\}$,
$\{P_{11}(t),E_{11}(t)\},\ldots,\{P_{0I0}(t),E_{0I0}(t)\},\{P_{12}(t),E_{12}(t)\},\ldots,\{P_{ij}(t),E_{ij}(t)\},\ldots,\{P_{wIw}(t),E_{wIw}(t)\}\}\}$ in which $I_a$ is the number of instances of FSMa (excluding the original as always), for all $a=1, \ldots, w$ and $s \in S_p(T)$, thus a sequence of, say, length p, and $P_i(t)$ is the sequence pointer pointing just before the ith token, and $P_{ij}(t)$ the state pointer in the $j^{th}$ instance of FSMI.

and $E_{ij}(t)$ the transition path through the $j^{th}$ instance of $FSM_i$.

Indeed: exactly one statepointer and transition path are in existence for an instance of an FSM if that instance of an FSM is in existence.

The beginsituation at t=0 is:

$\{RTN,s,P_0(0),1,0,\ldots,0,\{\{P_{11}(t),E_{11}(t)\}\}\}$ in which $P_0(0)$ is the sequence pointer pointing just before the first token in the token sequence, and all $I_a(t)=0$ except the first (only the root FSM has one instance, and $P_{11}(t)$, the state pointer in the root FSM's first instance points to its entry state, and $E_{11}(t)$, the path in that same instance has length 0.

To regulate how a situation changes from one tick to the next, the only moveable state pointer in the entire parsing system has by definition a considered transition. If this considered transition 1. is mapped to a zero token, the state pointer moves to the arrival state of the considered transition, and the transition is appended to the transition sequence of the FSM-instance.
2. is mapped to a terminal token, but this one is different from the token following the sequence pointer, the considered transition is set to the next transition from the state, or to the next transition departing from the state An FSM-instance in which the state pointer goes into waiting mode, causes a new instance of an FSM to be created, in which thus a new state pointer is created too. When the new state pointer in the new instance has transgressed all possible paths in the new instance and possibilities are exhausted there, the opposite happens: the instance is deleted together with its own state pointer and path, and movement is transferred to the calling FSM, in which the state pointer changes back to moving mode, and jumps to the other side of its e if the exit state has at least once been reached in the called FSM-instance that is deleted. If the exit state hasn't been reached there, the next transition from $n_k$ is considered, if it wasn't the last.

Initially both pointers are set to their initial position and no return pointers exist: the sequence pointer is set in front of the first token, the state pointer is set to the entry state of the root FSM (a first instance of it).

The force to proceed with parsing is the urge to move the sequence pointer each time a token further. This would mean that the sequence pointer jumps over a token $T_i$ which is always a terminal token, as the input sentence is an assumed legal token sequence wrt the RTN.

But this can only be done if the state pointer can find a pathway over the transitions and calls, such that the first transition that is labelled with the terminal token $T_i$. To find such a pathway, the state pointer is quickly scanning all possible pathways, and each time returns some or all steps if the pathway cannot be further extended unless a state transition is taken, associated with another terminal token. The most systematic way to do this scanning is: try every transition starting from the current state, and look with which token it is labelled:

If it's a zero token, it's admitted to jump (temporarily) and start scanning from the state at the other side of the transition.

If it's a nonzero terminal token, look if it's the right one. If not, try another transition from the current state.

If it is the right one, take the jump, and move the sequence pointer one further.

If it is an FSM token, create a return pointer at the other side of the transition, create an new instance (a copy of the FSM) that is called, and put the state pointer at the entry state of the called FSM. Consider this to be the new state from where to scan transition possibilities, and consider the called FSM to be the current FSM-instance.

If the new state is the exit state of the current FSM, look up where and in which FSM-instance the last return pointer has been set, jump to that state in that FSM-instance, and get rid of the return pointer. The state where the return has been made too, is the new current state.

If from the current state all departing transitions have been tried, successfully or not, the state pointer is set back to the state from where we first arrived at the current state, and that state is again set to the current state. We thus do a step back. Also the sequence pointer is set back too, to its position when we first came into this state. This stepping back may include jumping back from an entry state of a called FSM-instance to the state from where the call started. In such a jump, the call associated return pointer is removed too.

When we have stepped back, we continue to try the untried transitions leaving from that state, trying to make progress again for the sequence pointer.

This whole process is called backtracking, and it is an important concept in programming theory.

Until now, the backtracking process didn't result in anything interesting, as each time we progressed a step, we had to take it back at some later time.

Well, when the backtracking process is going on, and the temporary progress of the sequence pointer reaches the end of the sequence (is positioned after the last token), we have to go back anyway, but not without writing down what the call-tree structure, in other words the parse, is for the successfully bridged token sequence. Immediately after finding the parse (and 'writing it down'), the process continues by step by step destroying the bridge and trying to find another bridge by further backtracking. When literally every possibility has been tried, and backtracking is thus finished, a number of found, different parses still remain.

In computer programs that implement an RTN Parser, some precautions will normally have been added to prevent endless backtracking (very often possible!), by for instance limiting the level of call embedding or limiting the number of transitions taken within a certain FSM-instance (circular or cyclic paths are sometimes possible).

III.C Description of the Fsm/Rtn

The Language Editing System

This text focuses on a system to create and/or modify Finite State Machines (FSM), and the RTN or derivatives to which they belong. The system represents the abstract states and directed transitions as three dimensional objects in a three dimensional scene visible on a computer screen. To explain how creation and modification works, we first need to describe how visualisation works, even if visual representation in itself is not the subject of this document.

1 Object Hierarchy and Main Functions

For understanding the possibilities and manipulation facilities, that are described further on, a insight in the hierarchy of the objects, as they are internally conceived will be helpful. Most of these objects won't be presented as such to the user of the Fsm editor (and derivations).

Internally however, within the editor's machine, this organisation is of paramount importance, to obtain a consistent well ordered and growable system. Most functionalities available for the user are based on object attached software functions (procedures), that call other functions attached to other objects, while respecting the hierarchy of the objects. For instance, when a state is deleted in 3D space by a user mouse action, a Delete State function is called on the level of the 3DFsm, which is the level at which it is known if and which transitions depart and arrive from that state. To each such transitions, a 3DTransition object-attached 'Delete' is carried out, and finally a 3DState attached Delete is carried out. While carrying out for instance the deletion of a 3DTransition object, a deletion of the embedded 3DObject and Abstract Transition objects is done, and so on.

As may be supposed, the object based approach is inspired by good practice of object oriented computer languages. On this we must remark:

Remark 1. The implementation of the outlined hierarchical approach isn't limited to object oriented language implementations. It is in the first place a system to assure consistency and modularity of the elements that are to be manipulated and visualised. So, in principle, the ideas may be worked out in computer languages as far apart as assembler, plain C, objectless Fortran or C++ and Java. Also, the names involved can be chosen almost arbitrarily, and functionalities may be attached at a slightly higher or lower object level, or object composition may vary slightly, all without a change to the essence of this invention.

Remark 2. The outlined technology goes much further than the obvious object oriented language requirements: The object s function-sets are not at all limited to creation, deletion and serialisation and such. As a matter of fact such obvious functionalities are not explicitly mentioned in the following object description.

It may be a good idea to take a glance at the now following object descriptions, but don't expect directly to fully understand them. Instead, when reading the next two sections 2 and 3, turn regularly back to this section 1 as a reference. The following describes a "consists of, or embeds" relationship, in which child objects appear 1 indentation more to the right as their parent object, above them.

The following reference isn't intended as a complete description, as only important not too obvious or technical elements are mentioned.

1.1 The 3DObject
3DObject
  Type (for instance sphere, loop, straight arrow, bent arrow, loop . . . )
  Status
  Name to write on texture surface
  Texture Surface: a 2 dimensional picture to wrap around the object (see further: texture points)
  3DShape
    Type-dependent geometrical parameters to generate the shape with
    (for instance for a sphere: the centre and radius)
    array of (after generation based on Type and Type-dependent geometrical parameters)
      Triangles
        Array of three
          3 dimensional vertex points (x,y,z)
          3 dimensional normal vectors (in the vertex points)
          2 dimensional texture points that specify corresponding points in the Texture Surface. The 3D triangle will be wallpapered with a stretched copy of the 2D Texture triangle.
    Implementation dependent rendering instruction structure to instruct the computers rendering engine about the specific way the 3DShape should be rendered (the technical details).
  Function to change the 3DObject's Status and Name
  Function to Realise the object, that is to generate the actual triangles from the Type (telling its Shape) and the geometrical parameters. Also fills out the rendering instruction structure.
  Function to Un-realise the object by removing the actual triangles and rendering instruction structure, but leaving the geometrical description intact 1.2 FSM Object
Fsm
3DFsm
  3Dscene
    scene movement parameters (kinematics of spatial viewer-scene relation)
    3Dunit: universal 3D environment to show 3 dimensional triangles in a window
    flat background for scene
  array of
    3Dstate
      Abstract State
        Type
        State Index, unique within the Fsm
      3DObject
  array of
    3Dtransition
      Abstract Transition
        Type
        Transition Index, unique within the Fsm
        From State Index: Index of State from where transition departs
        To State Index: Index of State to which the transition goes.
      3DObject
  Function that tells on which 3DObject the user has clicked with his pointing device.
  Function to add a new 3DState at scene co-ordinates (x,y,z)
  Function to add a 3DTransition between two different states
  Function to add a looping 3DTransition going to and from the same state
  Function to remove a state that removes also every 3DTransition coming and going to it.
  Function to move a state to a new (x,y,z), that also moves the 3DTransition endpoints that are affected
  Function to decide if 3DTransition arrows should be straight or bent, and how bent 3DTransitions and looping 3DTransitions should be oriented toward each other to assure best visibility
  Function to generate a (x,y,z) scene point from the pointing device screen co-ordinates (x,y), from the mouse wheel (in case the pointing device has one) and from the current scene viewing angles.
  Function to set the background of a scene to a specific picture.
  Functions to change the movement of the entire scene, for instance to change the rotation speed of the scene around its vertical axis.
  Functions that await, seize and release access to data involved with real time rendering of the scene: It's important to avoid collisions of two processes running on the same computer. For instance one process might be redrawing a scene detail (rendering a 3DObject), which is cyclically started by a timer, and on the other hand, the deletion of the same 3DObject by an action of the user.
  Function to pop up a menu to the user, appropriate for the object the user has clicked on and for the context in which the 3DFsm appears: stand alone/RTN/Parse Tree/ . . .

1.3 the RTN Object
The Rtn Object embeds an array of Fsm Objects, plus an extra one with only states and no transitions. The object attached functions don't allow transition creation or state movement by the user. The user can create and delete states of two types and edit their properties
RTN
  Abstract Rtn
  Abstract essential elements of various kinds
  Database after Rtn 'Compilation'
  3DRtn
    array of
      3DFsm (each one is optionally present)
      3DFsm (only states and always present) This one is the one that clearly represents the RTN to the user, and whit which the user interacts to make changes on the highest level of the RTN.
  Function to 'open' one of the clicked member Fsms by creating a new window that represents the member Fsm base on a 3DFsm that is now present in the array and was derived from the Abstract Rtn.

1.4 the Parse Tree Object
The Parse Tree Object embeds one Fsm Object, with fixed nodes and transitions. The object attached functions don't allow any transition or node creation, movement or deletion the user. This object does not have any functionality for editing by the user. On the other hand, it has some special browsing facilities that allow to zoom in on data within a Parse Node.

3D Parse Tree
3DFsm (nodes and transitions)
No inherited editing functions available
Function to tell on which node the user has clicked (inherited)
Function to 'blow up' a parse node
Function to shrink again the parse node (the reverse of 'blowing up')

2Visual Representation 2.1 Visualisation of a Finite State Machine in 3 Dimensions Plus Optional Animated Motion.

How to represent abstract states as three dimensional spheres and directed transitions as three dimensional arrows in a three dimensional scene visible on a computer screen:

For implementing this in the framework of a program, one can choose to utilise what the operating system (and its extensions) offers, and what program software development kits (SDKs) offer to interface with these possibilities. For the Microsoft Windows versions, there are two possible ways to go: utilising the Open GL library or utilising the Direct3D library. For other operating systems, analogue libraries are often available. In theory, a programmer can program the equivalent of these libraries himself.

See FIGS. 1 and 2

In FIG. 2, Introduction to 3D visualisation: Parameter lines lead to two sets of more or less parallel lines on the surface. Stepping each of the two parameters leads to lines that form approximate quadrangles, each of which can be split in two triangles that are assured to leave no gaps. In this way, a smooth surface is approximated by a set of contiguous flat triangles. In the figure, the example of a sphere is shown.

In all these cases, the programmer has to set up a three dimensional scene, built up with simple elements, each of which has to be precisely defined. For example, every massive object can be divided up in triangles, by parametrising the surface of the object. For a sphere, parametrising can be done by specifying two angles, analogue to specifying geographical co-ordinates of a given point on earth. By choosing a certain interval on each angle increment, a finite set of points is created on the sphere. They form quadrangles on the surface. Each of them can be divided in 2 triangles, that are always flat, unlike the quadrangles. The set of all triangles will resemble the surface of the sphere if the resolution (dependent on the angle intervals) is fine enough.

By using analogue ways to divide other surfaces like cylinders and cones into sets of triangles, one can replace the mathematically ideal surfaces by acceptable sets of triangles.

In some SDKs, possibilities exist to approach the ideal shapes by using so called NURBS (non uniform rational B-splines), which is a more economical way to divide up the surface into smoothly curved pieces of approximations, instead of triangles, but this more complex method works essentially in the same way. For some functionalities, the inside of the library will convert the NURBS surfaces to sets of triangles anyway.

Once all objects are replaced by sets of triangles (or NURBS-es), the programmer has to choose where the point of the viewer is situated, and how the scene co-ordinates (x,y,z) relate to the viewer co-ordinates (r,u,v). This is done by utilising 3 or 4 dimensional matrix multiplication and or addition. These correspond to shifting the scene, enlarging/diminishing the scene, and rotating the scene. The advantage of utilising 4 dimensional matrices is that rotation and translation can be done in one multiplication. All such mathematical manipulations can be found in textbooks on Open GL for instance, but also in some geometry handbooks.

The mentioned 3D libraries that extend the operating system are compatible with such matrices, and with such sets of triangles or NURBS.

See FIG. 3 and FIG. 4

In FIG. 4, Introduction to 3D visualisation: How a 3D triangle can be described with the co-ordinates of its three vertices. For reflection, the normal (perpendicular) direction of the smooth surface to be approximated will be derived from the normal vectors on the smooth surface at the three vertex points.

In Direct3D for instance, the program sends a chunk of data that contains all triangles of an object to the library, for each object, a chunk of data with the perspective, scene position, and scene rotation to the library, and a chunk of data with positions of at least one light source, and its colour and other relevant properties. The data for triangle contains its the three co-ordinates of each of its three points, together with the co-ordinates of the normal vector in each of these points. If the object is uniformly coloured, the colour, reflectance and such properties is specified for the entire objects (i.e. set of triangles).

See FIG. 5

If the object is covered by some wallpaper-picture, the picture is specified for the object, and each of the triangles corners get 2 extra co-ordinates, describing a point on the picture, and the three 2-dimensional points on that picture form a corresponding triangle on the picture, will be stretched out by the library so that it covers the triangle in the three dimensional scene.

Once all such data has been transferred in the prescribed way to the library, the library is ready to accept rendering commands.

A rendering command will ask to display a three dimensional scene within a window on the computer screen, or on the entire screen.

About animation:

As the screen is only able to show 2 dimensions, the 3 dimensional impression gets a lot more convincing if the view on the screen isn't static but animated (moving).

To animate, the library will often allow to draw in two buffer display memory areas, among only one at a time is visible, while the other is being redrawn (updated). In this way, only completely drawn images are shown to the viewer.

Of course, to give the illusion of motion, each consecutive image has to be slightly different, and the swapping of the display buffers has to be regular, and by preference not much slower than 25 swaps a second, to create the illusion of continuity.

See FIG. 6

FIG. 6: Introduction to 3D visualisation and animation:

By having two buffers to draw the visualisation in, and multiplexing them in turn to the viewer, one can create the illusion of steady movement. While one of the buffers is in view, the other one is being updated (redrawn) with a slightly 'moved' scene. In this way the viewer doesn't see any half finished drawings.

If the only movement is the rotation of the scene, then it's sufficient to change the scene rotation (matrix) each time a bit, and feeding it again to the library. If the objects have to change places, the co-ordinates of the triangles must be changed each time, or be moved/rotated separately by an object-specific translation/rotation matrix. If the object itself has to change its shape, it should be recalculated entirely.

Finally, the fixed or animated view can be decorated with a background picture by again sending a chunk of data with its specifications to the library.

The process of (re)defining the screen content is done by the program, which is driven by a regular timer, that each time makes some changes and asks to redraw the scene and finally to swap the fresh buffer into view.

The nature of the motion of the scene is defined by how the rotation angles evolve in time. A linear increase of one of the three so called Euler angles will simply cause a smooth rotation.

By clicking on the background (see further) a pop-up menu pops up with several possibilities to let the angles evolve and to change the speed of the movement. One of them is called 'wobbling', this means that one of the angles follows a sinusoidal function of time, so that the orientation varies in a periodical wobbling way. Another possibility is to let the (un-pushed) mouse position decide the angles.

All this is fairly standard.

What is not standard is which subjects are rendered

The scene showing an FSM contains several states as three dimensional spheres, and directed transitions between them, including reflexive ones, shown as straight or bent massive arrows. The FSM visualisation system converts abstract transitions to massive arrows of three different kinds:

If it's a reflexive transition, the arrow has the shape of a solid loop, without a direction indicating conic piece. If there are several such reflexive transitions on the same state, they spread spatially, so that they overlap minimally: they appear to be rotated around an axis through the state. This shape is generated by combining a torus sector with two little tubes, which all have triangles of their own, that go into one object set.

See FIG. 7

FIG. 7: Examples of shapes to visualise transitions between states, as is used for natural language modelling. The shapes are built up from elementary mathematically simple shapes like spheres, tubes, cones and segments of torusses. Transitions come in three varieties: reflexive ones, non reflexive straight ones and non reflexive bent ones. This figure shows an example of how the reflexive transitions can be visualised, and how such shapes can be spread spatially if several are attached to the same state, so that every single one remains visible.

The state itself is here visualised as a sphere.

If it's between two different states, and only one transition exists between them: the arrow is generated by a long straight tube (cylindrical) part and 2 cones at one end to indicate the direction.

If it's between two different states, and more than one transition exists between them (possibly in different directions): the arrow is generated by a long sector of a torus (a bent tube) part and 2 cones at one end to indicate the direction.

See FIG. 8

FIG. 8: This figure shows an example of how the non reflexive transitions can be visualised, and how such shapes can be spread spatially if several are going back and/or forth between the same two states, so that every single transition remains visible. The long tube is a torus fragment or a piece of a straight cylinder, while the arrow part is built from two conic pieces.

If the transitions are labelled, a short form of the label text is used as wallpaper on them.

If the FSM exists in the framework of an RTN or derivatives, two states (shown as spheres) are special: the entry and the exit state, and the sphere's surfaces are specially wallpapered to indicate their special function. Also, the background of the wallpaper of transitions associated with calling of other (or the same) FSMs is differently coloured.

1.2 Example of how the generative power of one complex FSM with repeating network parts can be represented more efficiently in an RTN composed of more than one FSM.

See FIGS. 9a and b

FIG. 9a: Introduction to Finite State machines (FSMs):

In the figure, a special FSM is shown with one entry state and one exit state, and every transition labelled with a general token a,b,c, etc . . . , which are not to be confused with letters of the alphabet, because such FSMs can exist outside of a linguistical context too, e.g. a chemical process, a operational scheme for human interaction in an organisation, etc . . . . But even in such contexts, the FSM functions as generator and restrictor of valid token sequences. Such sequences resemble words if the tokens are represented by letters An independent FSM capable of generating sequences like (examples):

"apsxxxvjln" or "begio" or "acdhqtumo" and so on.

An illegal sequence is (example): "agin", "apsxxxv" or "hqtumo".

A sequence has to start at the in'-state and find a path to the 'out'-state.

FIG. 9b: The RTN composed of the S and P FSMs is in this example capable to generate exactly the same sequences as the independent FSM above, if S is specified as the basic FSM in the RTN. Arrows in S, labelled P, are said to "call" FSM P.

Generally, an RTN will have more than two member FSMs, and calls can be made in the non basic FSM too. In fact, every member FSM can call every member FSM, including itself. In this way, a recursive system results.

1.3 Example of a simple RTN and how the RTN overview can be simultaneously displayed with the contents of several of its member FSMs.

1.3 Example of a simple RTN intended as a super simplistic syntactical grammar model for English.

See FIGS. 10a,b,c

FIG. 10a: Overview of an RTN: the member FSMs are shown as spheres without showing their internal structure. Also shown as spheres are the labels that not calling transitions can have, anywhere in the RTN. Clicking on the FSM-spheres, causes a window to 'open' which reveals its internal structure.

FIG. 10b

View of one particular member FSM

Internal structure of a member FSM. Remark that the spheres in the RTN-overview representation, are now represented as arrows, except, of course, the FSM that is the subject of this view.

FIG. 10c

An RTN overview, plus the internal structure of several of its member FSMs.

See FIG. 11

FIG. 11: Example of a simple syntactical RTN

With this syntactical RTN, which is a simple grammar model, the following examples of sequences are legal;

"Det Adverb AdjectiveVerb",

"PersPronoun Vbe Vpastpartic"

This syntactical RTN, together with a lexicon leads to a simple language model.

The lexicon lists words and to which word class they can belong. For instance:
- the: determiner
- fish: noun
- late: adjective, adverb
- is: Vbe
- are: Vbe
- this: determiner
- boy: noun
- green: adjective
- see: Verb
- seen: Vpastparticiple
- a: determiner
- tree: noun
- very: adverb
- has: Vhave,Verb
- have: Vhave,Verb
- he: PersPronoun
- she: PersPronoun
- we: PersPronoun
- sees: Verb
- etc . . .

In this case, the terminal tokens are word classes and the FSMs are word groups belonging together.

1.3 An example of a Parse Tree when an English sentence has been parsed according to the previous syntactical grammar RTN.

See FIGS. 12a and b

FIG. 12a: The representation of a Parse Tree: Example for the example RTN and an example sentence.

The representation of a Parse Tree: Example for the example RTN.

When a particular sequence (for instance derived from a sentence) is analysed with an RTN (a syntactical grammar model) by using a PARSER, one or more tree structures result.

These trees are again represented in a particular view, which is conceptually different from the RTN Overview and from the FSM content view.

Example: The sentence "The very young boy has seen a very high tree."

This leads to the sequence:

"Determiner Adverb Adjective Noun Vhave Vpastparticiple Determiner Adverb Adjective Noun". You can verify this is a legal sequence in the example.

Remark that the view has some resemblance with the RTN overview (FSMs and word classes are represented as spheres).

In this case, however, not all of them occur, and on the other hand, some can occur several times. Each occurrence is called an 'instance'. The difference between an instance of an FSM and the original template, is that in an instance, only one particular path is taken inside the FSM from 'in' to 'out'.

FIG. 12b: The inner of procedure nodes in a Parse Tree

Very important is that a parse tree only has meaning for a particular (legal) sequence, and that they don't belong to the language model. They are only a particular application of the model.

Clicking on FSM nodes in the parse tree toggles opening/closing the FSMs.

The content of the FSM becomes visible, different from the separate FSM view by the size, but also by the highlighted path. These mini-views are not editable.

Apart from the highlighting of the actual path, animated highlighting is also available which is useful in case some transitions are taken several times.

This animation highlights one transition at a time, in the order of the path. After the end is reached, the cycle is repeated.

2.2 Visualisation of an RTN Representing a Grammar in 3 dimensions plus Optional Animated Motion.

A lot is similar to the visualisation of an FSM, except that the spheres each represent an FSM or a terminal symbol, and have thus have names unlike the states in the internal structure of an FSM, visualised as described in 1.1. We stress that the internal structure of each FSM belonging to the RTN isn't visible in the 3D window: each FSM is just a sphere with its name painted on it. Only the background colour of the text seems to distinguish FSM spheres from terminal spheres.

In the special case of a unified view of morphemic and syntactical grammars there are even three differently coloured types of spheres in the scene: morphemic terminals, morphological FSMs and syntactical FSMs. The spheres are built up and rendered in the same way as described in 1.1. Only the positions of the spheres in the scene will be handled purely by a fixed program, and the user isn't allowed to change their positions.

Thus far, we only have spheres in the scene.

The user can choose the option (by using the right mouse button pop-up menu) to indicate which element occurs in which other element, and this is shown by the arrows, in this view without text written on them.

The view essentially summarises the entire grammatical system without showing the internal details of each FSM belonging to it.

Things that go further than just displaying are:

Clicking with the mouse on one of the spheres that represent an FSM, causes a new window to be opened that shows the internal content of that particular FSM, in the way described above in 1.1. The original window with the summarising grammar remains normally visible, so that more FSMs can be clicked on, resulting in several views, each one showing the internal structure of one FSM.

Understanding how the system to do this works is obvious: the mouse click causes a special rendering of the 3D scene and gives back the identity of the surface clicked upon. If the surface represents an FSM, a new window is opened and the particular FSM is displayed according to the system described in 1.1. Otherwise nothing happens (a terminal doesn't have internal structure worth to be shown in a separate 3D window).

Only straight arrows and loops will be shown, because 'a occurs in b' can only be true or false (the number of times that a occurs in b isn't important).

The motion of the scene is completely similar to the system described in 1.1.

2.3 Visualisation of a Parse Tree in 3 Dimensions Plus Optional Animated Motion.

Again the general displaying system of 1.1 is used. The spheres represent now instances of FSMs and of terminals, which means that they can occur several times, but they have further the same appearance as in the grammar view of 1.2. Contrary to view 1.1 and 1.2, the parse view doesn't mean to show properties of the language, but it shows properties of one particular sentence, given a language (grammar+lexicon).

The spheres represent the items of the grammar found in the sentence (several occurrences means several spheres, even if they are different 'copies' (instances) of the same grammatical item.

Arrows represent parent-child relationships between the found items, and a fixed system of positioning the spheres, according to parental hierarchy causes the displayed structure to seem like a flat 3D tree, moving together with the 3D scene.

Things that go further than just displaying are:

When an instance of an FSM (originally shown as just a sphere with its name on it) is clicked on, a very special animation starts: the sphere grows, pushes the other spheres a bit aside and seems to open up partially, and its contents become visible within it: almost completely like described in 1.1, but in diminished form so that it fits within the sphere. An important difference with the visualisation of 1.1 is that some transitions (within the opened up sphere) have special colours to indicate that the parse path has actually taken this transition.

Also, the mini view of the FSM within the opened up sphere, isn't editable.

Several such FSM internals in the parse view can be shown together, all within one 3D scene and window.

3. Creating and/or Modifying the Represented FSM as Described in 1.1

This is done by means of a pointing device, for instance a mouse, preferably a so called wheel mouse (to have three dimensional freedom to move a sphere in the scene).

3.1 Creating New States

At creation, only two states are shown, and the user probably will want to add states to the scene. To do this, he clicks on the background with the left mouse button for instance, and a new state appears under the mouse cursor.

This can be done as follows:

When the left mouse button is clicked, it is possible to the program to ask at which 2-dimensional point (u,v) in the window this occurs. By doing the reverse of the rendering transformation, the point (r,u,v) is transformed to scene co-ordinates (x,y,z), and a new abstract state is added to the abstract FSM, for which then a sphere is created with centre (x,y,z) and standard radius. Normally the rendering transformation will include perspective: the further the object, the smaller it appears. So, apart from the (u,v) co-ordinates given by the mouse position, a "distance" to the viewer is needed, called r. This r is always chosen to be equal to the distance of the scene centre.

Because the scene has changed, finally an extra rendering cycle is done 3.2 Deleting States This is done by pointing the mouse to the corresponding sphere, and clicking on the right mouse button. A pop-up menu appears close to the pointed place. (The program can ask to the operating system where the mouse cursor is). The pop-up menu contains the menu-item "delete". If this choice is made, the program can ask to the library if the position of the mouse was upon one of the three dimensional objects, and if so on which one (the closest to the user, at the point under the mouse cursor). This actually is done before the pop-up-menu is created and shown, in a special rendering cycle, in Direct3D, in other systems something analogous takes place. The fact that this is possible in the library is very useful, because otherwise it would require the programmer to dig deeply in the rendering system.

Once the object is known, and it appears to be a sphere corresponding to a state, the state is removed from the FSM, together with its spherical representation.

If the state had transitions arriving or departing from it, each transition is removed from the FSM and each corresponding solid arrow.

Removing three dimensional objects from the scene is simple: the corresponding data burst isn't anymore referred too during a rendering cycle, and the data burst will be set free.

Because the scene has changed, finally an extra rendering cycle is done 3.3 Creating Reflexive Transitions This starts too by pointing the mouse to the corresponding sphere, and clicking on the right mouse button. When the pop-up menu appears, the user can choose "Add loop". If he does, the system (knowing which object is being pointed at, see above) creates a new reflexive transition. If transitions are expected to be labelled, as in the framework of an RTN or derivative, a second pop-up menu appears before the transition is rendered, in which one of the already known labels can be chosen, or one can choose 'new', and the name for an as yet unknown label is asked. After this, the transition is added, the corresponding loop shape is created and drawn, with the label painted on its surface.

Because the scene has changed, finally an extra rendering cycle is done 3.4 Creating Transitions From One State to Another Different State This starts too by pointing the mouse to the corresponding first sphere, and pushing on the left mouse button, keeping it pushed and moving toward the sphere representing the destination state and releasing the button upon it. After this the system adds a transition to the FSM, and creates and draws a corresponding solid directed arrow from the first sphere to the last. The system knows which one the first state was, as was described above, but now, the pointed object detection system works a second time when the button is released, now based on the release mouse cursor co-ordinates. Before the new abstract transition is added, the system asks via a pop-up menu which label the transition should have (if applicable), and creates an bent or straight arrow shape (depending on already existing transitions) to represent the transition, and draws it, with the label painted on its surface.

If there were already transitions between the states, the straight ones are bent, and all bent ones are evenly spread in space (by rotation around an axis through both states).

Because the scene has changed, finally an extra rendering cycle is done 3.5 Deleting Transitions This works in the same way as deleting states, except that deletion of a transition doesn't cause deletion of any states. In case only one arrow is left it will be replaced by a straight arrow. Otherwise the remaining arrows are evenly spread in space.

Because the scene has changed, finally an extra rendering cycle is done.

3.6 Moving Spheres (Representing States)

Again the mouse is pointed at the state and pushing of the left mouse button is done (dragging movement). Other than in the case of making transitions, the button is released above the scene background. This is the new position of the sphere (state). The system works as follows:

The left mouse button pushing identifies the object, so its (x1,y1,z1) in the scene is known. By performing forward rendering transformation on this, a (r1,u1,v1) is calculated. Only r1 is used: when the mouse button is released on the background, the mouse position there is (u2,v2). To these the depth in the screen r2 is added, default set equal to r1. From (r2,u2,v2) an end position (x2,y2,z2) in the scene is calculated, using the reverse rendering transformation, and the sphere object is moved from centre (x1,y1,z1) to (x2,y2,z2). Moreover, if there are transitions at the state, the endings that start or end on it are moved to the new position too, causing size and orientation changes of the arrows concerned. (Such changes are done by matrix multiplication of each of the co-ordinates of the triangles, together with similar transformation on the normal vectors).

Because the scene has changed, finally an extra rendering cycle is done. Let's remark that moving of states doesn't change the abstract FSM.

III.D The Parser

Introduction

Any parser that includes the concept of RTN, whether this is hidden or explicitly stated, takes a sequence as input and delivers a tree structure as output. Such a tree structure can evidently be drawn as a tree structure, but alternatively, as a stair graph. In FIG. 13, it is shown by an example how a stair graph corresponds to a root up tree structure.

FIG. 13: This figure tries to make clear the correspondence of stair graphs with parse trees, by letting gradually evolve a stair graph into a corresponding parse tree and the other way around. Seven intermediary stages are shown. It is important to understand this correspondence, and this figure will be a help for it.

In the stair graph, we now have valleys and tops.

See FIG. 14

FIG. 14: This figure shows how a piece of stair graph pathway corresponds with a piece of the path through an FSM. FP is called so we can continue from the FP entry State, then we take transition a, then transition b, and then we want to take transition EP, which is thus labelled with the FSM EP. This causes a call to EP in our path, after which we will go further in FP. Remark that we take a path through an instance (a copy thus) of an FSM, and never through the original FSMs.

The tops correspond to Terminals, as do the endings of every branch in the original tree structure. The Parser is based on the idea that the possible fragments of the stair graph in between two consecutive nonzero terminals (by extension including the begin and the end of a full stair graph), called 'Bi-Swings' (derived from the fact that in between two adjoining terminals in a stair graph, in general a valley swings in between), can be listed, and that the list is finite for a certain RTN if the number of procedures and terminals is limited and if we restrict the level span (steps from the valley bottom to the highest of both Terminals) within such Bi-Swings. This is a reasonable and acceptable supposition for normal natural language. It will be clear that the number of possible Bi-Swings that are in accordance with the RTN, grows exponentially (not necessarily in the strict mathematical sense) for increasing maximum level spans. Practice however learns that a technologically feasible maximum span to allow storage of all Bi-Swings in computer RAM suffices to deal with the vast majority of natural sentences complying with the grammar modelled in RTN-including high quality language models.

Another way to produce a Bi-Swing of infinite length would be by infinitely cycling over cyclic zero-transition-only path (while staying within the FSM) as part of a Bi-Swing, but such paths should be forbidden in every FSM that is member of the RTN.

This Parsing system was named 'Swing Zip Parser' by the author, which name is derived from the way Bi-Swings (or in general n-Swings) are checked for appendability, against a growing concatenation of such elements to which they could be attached.

What are the Benefits and Drawbacks of the Described Parsing System

The main drawback is that the parser has to include the RTN concept. On the input side this means that a number of radically different approaches can't easily be reconciled with the described Parser. On this subject we must stress that many parser types, maybe most, do include in some way, hidden or explicitly stated the principles of RTN. Inclusion of RTN does not at all rule out very high further sophistication. Such sophisticated enrichments can still be used together with the Parser, either as pre-processing or post-processing or both. The pre-processing can ensure that presumably rare incompatible sequences are converted to RTN compatible sequences or that they follow another way. The post-processing can filter the parse forest according to sophisticated criteria and possibly alter tree structures.

Another drawback may seem the absence of inherent robustness when fed with imperfect language.

On the output side, the output is a forest of Bi-Swing sequences and if required (normally), a forest of tree structures. A separate mechanism is required to compact the forest into a chart, which has its undeniable advantages.

See FIGS. 15a, b, c and d

FIG. 15a

Stair graph pathway in detail shows the Steps. Each Step, shown as short uninterrupted line pieces corresponds to a jump over a transition to the same or another state within an FSM, or half of the jump to or from another FSM. Remark the occurrence of zero transitions.

FIG. 15b

Stair graph pathway in detail shows the Links (spans indicated with slanted lines), the longest paths over consecutive zero terminal transitions and bordered by any other kind of step. By consequence, Link-paths stay within an FSM instance. Links can be interpreted as concatenations of Steps, within the mentioned borders.

FIG. 15c

Stair graph pathway in detail shows the Bi-Swings (spans indicated with horizontal lines). Bi-Swings are concatenations of Links, bordered by 2 Terminal transitions at any level.

The start and ending of the entire token sequence are considered Terminal transitions too, so that the entire sequence can be spanned with Bi-Swings.

FIG. 15d

A legal Stair graph pathway is being built by concatenating Bi-Swings, for instance from left to right. Apart from the left-right connectability of subsequent Bi-Swings, three other criteria limit the possibilities:

1. Correspondence of built pathway with descending parts of the new candidate Bi-Swing. This is checked efficiently by the Zipper-checking process.
2. The prolonged pathway cannot go below level 0.
3. The prolonged pathway cannot go above a certain maximal level.

On the benefit side, one of the major advantages is the speed of the Parser, which is many times that of an ordinary RTN (backtracking) parser or even a Tomita parser.

Also, compliance with RTN is not a big compromise, if pre- and post-processing are allowed too, and if one considers that we know very soon if the input is parsable, so that, in case there's no parse, we can try to 'correct' the input from partial parse information, which is a step to robustness.

Another important advantage is the possibility to implement the Parsing process as a parallel processing process. Not only can the parsing be done front to back and back to front simultaneously until both sequences meet. Long sentences can benefit from additional island parsing, seeded from regularly spread points in the input sequence, and growing until two of the processes meet, and unify. Island parsing processes are not as efficient as the other two possibilities as the grown sequences can grow indefinitely in both level directions, as consequence of not knowing the ground level of the grown stair graph fragment.

How to Build the Bi-Swing List

So the language knowledge 'food' of the Parser are the Bi-Swings in the list. To build this list, we must first direct our attention to still smaller Stair Graph-Fragments than Bi-Swings. See FIGS. 15a, b and c.

The FIG. 15b illustrates this for the example tree. These small fragments correspond with Links (see definition).

Step1: Link Generation

They are defined as the largest possible Bi-Swing fragments that remain within one FSM that is member of the RTN. From this, we distinguish the following 5 possible types of Links:

(In this we will split transitions labelled with a call to another FSM in a first half and a second half. In the figure of stair graph fragments this is done by splitting the vertical line representing one step in two halves. In this case the corners in the shape of a mirrored 'L' and of an 'L' represent the first and second half of a calling transition. In the same way, transitions corresponding with terminals are split in two, this time delivering just flat line pieces of half length.)

1) Starting from a terminal transition and ending on a terminal transition on the same level, never leaving the FSM
2) Starting from a terminal transition and ending on a transition calling another sub-level FSM.
3) Starting from a terminal transition and ending at the end state of the FSM, ready to go back to another calling FSM.
4) Starting at the second half of a calling transition and ending in a terminal transition.
5) Starting at the second half of a calling transition and ending in the first half of another calling transition. (these pieces are at the bottom of the Bi-Swing valley)
6) Starting at the second half of a calling transition and ending at the end state of the FSM, ready to go back to another calling FSM.
7) Starting at the entrance state of the FSM after this FSM was called from another FSM, and ending in a terminal transition.
8) Starting at the entrance state of the FSM after this FSM was called from another FSM, and ending on a transition calling another sub-level FSM.

Remark that the also thinkable possibility "Starting at the entrance state of the FSM after this FSM was called from another FSM, and ending at the end state of the FSM, ready to go back to another calling FSM." Shouldn't be possible because we impose the requirement for the member FSMs of the RTN that it always should be impossible to find a path through the transitions of the FSM that starts at the start state and ends at the end state and that is only composed from zero transitions. Of course, the start state is always assumed to be different from the end-state in each FSM.

Because of the finiteness of possible paths corresponding with the 8 types of links, and the fact that we can remain within the FSM we can generate all the Links for the FSM, by backtracking within the FSM level, starting from the entry state, then from the occurring terminal transitions, then from the occurring calling transitions, backtracking generates a Link each time that we either reach the end state of the FSM, a terminal transition or a calling transition. Algorithm in pseudo code: (start in Generate All Links)

See FIG. 17

Every generated link is specific for the FSM and contains the path through the FSM. With the exception of the first and the last step in the Link, all pieces of the path consist of zero transitions.

Step 2: Bi-Swing Generation

For each ordered pair (terminal1,terminal2) a list of Bi-Swings is generated. Again we backtrack, but on an entirely different level as in step 1. We will concatenate Links regardless of the FSM to which they belong, starting with a Link that starts with a terminals transition and ending with a Link that ends with a terminal2 transition. In between these two, the Bi-Swing consists of a concatenation of Links that do not contain terminal transitions (thus of types 5,6 and 8). As the Bi-Swing comprises a valley in a stair graph (see FIG. 15c), it will be clear from the derivation of a stair graph from a tree structure (or corresponding stair graph) like in FIG. 15c that the left side Links must correspond to right side Links on the same height in the sense that they should belong to the same FSM-instance, and that the left one ends at the first half and the right one starts at the second half of the same calling transition. In spite of these restrictions during the concatenation process (that are posed for concatenation with the first and/or last Link), there may well be many paths over the Links that result in valid Bi-Swings, because extension of such a concatenation path may allow at some point in the descending part of the valley, a choice between several Links. For a given left slope of a valley, there's only one possibility for each corresponding ascending Link on the right slope. There still could be indeterminacy on the right slope for flat Links, but the only flat links are links of type 1, thus beginning and ending in terminals. We must conclude that the only indeterminacy in composing the right side slope of the valley, given a certain left side slope, is at the last Link that ends in a terminal2 transition, and if the right slope ends higher than the left one, in all Links that are above the Left slope. In case the At the bottom of the valley, there is also indeterminacy in the choice of the flat links.

Algorithm in pseudo code: (start in Generate All Bi-Swings)

(Remark that the path is formed by a sequence of Links this time.)

See FIG. 18

The 'level span' of a path of Links is the difference in height between the highest Link and the lowest Link in the path, when the path is drawn as a Stairs Graph fragment.

Generating a Bi-Swing comes down to copying the path of Links (actually only mentioning for each Link the index of its FSM in the RTN and an index of the Link within that FSM, as these two number unambiguously identify each Link), and preparing the Bi-Swing for 'Zipper concatenation' at both sides by keeping the left end/right end difference of its stair graph fragment and preparing a corresponding 'zipping' array of transition identifiers which are (FSM index, calling transition index) pairs, that will allow during the actual parsing to check connectability of Bi-Swings to be added to a path made from a sequence of concatenated Bi-Swings (see the parsing algorithm itself). Connectability is checked by shifting the 'Zipper' array to the correct height, and checking the correspondence with the 'Zipper' array of the current Bi-Swing path (see FIG. 15d). The match can be imagined as matching same height transition identifiers from the bottom toward the top, like in a Zipper. If the zipping stalls on a not matching transition identifier, the addition of the Bi-Swing to the path fails.

Organising the Bi-Swing List for Ultra Fast Lookup

As the input for the Parser is a sequence of terminals (for instance derived from a sentence by replacing the words by word classes, which are terminals), or a chart of terminals, it's very useful to replace each possible sub-sequence of two terminals (terminal1,terminal2) by an identifier of a list of corresponding Bi-Swings. In the generation of the Bi-Swings we indeed sorted them in separate sub-lists corresponding to all possible couples like (terminal1,terminal2). So that's easy.

The next thing we want to optimise for speed is the connectability of Bi-Swings belonging to such neighbouring list, for instance the list for (terminal1,terminal2) and for (terminal2,terminal3). Connectability properties at the left side are different from those at the right side of a Bi-Swing. Regarding Bi-Swing to Bi-Swing connectability, we must match the right connectability of the first with the left connectability of the second. As Bi-Swing have (Links with) terminal transitions at both sides, a first connectability requirement is to check whether both terminal transitions are the same (same FSM, same transition within FSM).

We can easily give each transition in the RTN a unique identifier from before, so that checking the first connectability requirement amounts to just checking if these identifiers are equal. As we have not just one Bi-Swing and another to match but two lists of Bi-Swings, the rightmost of which we want to eliminate Bi-Swings in that do not match any Bi-Swing of the left side list, the system is to take each Bi-Swing from the left side, and keep matching Bi-Swing from the right side list (in the case of left to right parsing aka 'forward parsing').

Instead of going through the right side list, which is the list corresponding with (terminal2,terminal3), we can pre-sort within this list according to the transition identifier. If we choose our system to assign unique identifiers to each transition in the RTN in a smart way, we don't have to search for matching Bi-Swings, we get immediately a sub-list of the (terminal2,terminal3) Bi-Swing list that fulfils the first connectability requirement. This list may well be of length zero.

The second connectability requirement involves the zipping correspondence checking process, which in principle can be done between two Bi-Swings, but except in the case of a parallel processing and parallel parsing, normally either the left Bi-Swing belongs to a concatenated sequence of Bi-Swings (in the case of forward parsing), or the right one (for backward parsing). In this normal case, it will be more efficient to try to zip the BiSwing that is candidate for sequence prolongation, together with the (probably much longer) Zipper half of the sequence.

We must remark that zipping-checking is only necessary in less than half of the cases. For forward parsing it's only necessary and even possible if the right hand (climbing) slope of the Bi-Swing's stairs graph is higher then the left (descending) one.

Once we have the long and the short Zipper halves, it would be nice to optimise zipping-checking. For that we imagine for a moment the zipping process going on in the upward direction, as the level of the left start of the candidate Bi-Swing indicates the place on the short half Zipper from where zipping starts upward and that is vertically aligned with the right side ending of the of sequence to be prolonged. In fact, we don't need to keep the zip values from Bi-Swings from the bottom of the valley up to the highest slope, but only the part that tops out above the level of the other (lowest) slope of the Bi-Swing. So the Bi-Swing's essential Zipper half is defined to be this array of transition identifiers (which are values to zip-check).

this is where both Zipper halves are aligned. This array of say N values, each of M bits, can be considered as one value of N×M bits, which is the last criterion to further order the sub-list of the list for (terminal i, terminal j). This ordering allows fast binary search of a selection within this last sub-list that complies with the second connectability requirement. Anyway, often the sub-list in which to search will be short if it has any members at all, in which case it is more efficient to apply linear searching for a complying Bi-Swing range. In presumably rare cases where we do expect many members in the sub-lists, the searching may again be avoided by a yet deeper sub-listing.

Except in the cases of island parsing or parallel parsing, there is a third connectability requirement: As parsing started at one of both ends of the terminal sequence corresponding with a sentence for instance, their is absolute level height available at any point in the Bi-Swing sequence as can be seen from the stairs graph (at the start the level is absolute zero). For each Bi-Swing candidate to be appended we know how much deeper the bottom of its valley goes under its connecting point with the rest of the sequence. If after appending, the stairs graph would go below zero, the connection is forbidden. The checking of the requirement is straightforward and can be done very fast. It's thus a good idea to check this before checking the second (Zipper) requirement.

For island parsing or pieces of parallel parsing, the zero level is unknown, and it's impossible to control this requirement.

Often it's interesting (efficient) to limit the level span of the built sequence, which is an optional fourth connectability requirement. We must remark that this is not necessary, because it's automatically limited by the sentence length and the limits to the span imposed on Bi-Swings, which is an absolute necessity.

Finally, regarding the optimal sub-listing structure of Bi-Swings: This is dependent on the parsing direction, so if we want to parse in two directions, we need to sub-list each (terminal1,terminal2) list in two separate copies.

During the Parsing Itself

Forward parsing: The sequence of Bi-Swings is has to start with a Bi-Swing starting on the (pseudo) terminal "sentence-begin". The sequence ends successfully when the parser succeeds in successive right side appending of Bi-Swings to the sequence and the last Bi-Swing ends on the (pseudo) terminal "sentence-end".

Backward parsing: The (reverse) sequence of Bi-Swings is has to start with a Bi-Swing ending on the (pseudo) terminal "sentence-begin". The sequence ends successfully when the parser succeeds in successive left side appending of Bi-Swings to the sequence and the last Bi-Swing starts on the (pseudo) terminal "sentence-begin".

Normally, while building valid Bi-Swing sequences, at several points in the input terminal sequence, there may be several possibilities to prolong the sequence. In fact, not just one Bi-Swing sequence will be generated, but a tree structure of ever branching Bi-Swing prolongation possibilities. This 'Bi-Swing sequence-tree structure' is not to be confused with a parse tree. The Bi-Swing-sequence-tree structure can best be imagined as laying on its side and has its root at the left side of the sentence and gets ever more branches toward the right side of the input sequence (for forward parsing). Only branches that reach to the end of the input sequence lead to full parses. Full parses are sequences that one gets by starting from such a branch-ending and going back to the left and by reversing this sequence. For backward parsing the root of the tree is at the right hand side, and full parses are obtained by starting from branches that reached the begin of the sequence (sentence), and taking the Bi-Swing sequence path that leads to the root at the right. No reversal is necessary in this case.

Instead of making a real exemplar of the virtual Bi-Swing sequence that corresponds with a newly obtained branch ending, so that its connectability properties can be matched, these properties are calculated and attached instead to the valid branch endings The Parsing algorithm for forward parsing is then as follows:

---

(start point at Parse Terminal Sequence function)
Parse Terminal Sequence function working on a sequence of terminals
{
    initialise an empty Bi-Swing sequence-tree structure
    set its branch ending terminal to the 'sentence-begin' pseudo
    terminal
    set the input sequence pointer (thus the current position) to the
    first terminal in the input sequence (which should be the
    'sentence-begin' pseudo terminal)
    call Recursively Grow Bi-Swing Tree Prolongations
}
Recursively Grow Bi-Swing Tree Prolongations function
{
    we call the last terminal in the branch ending "terminal1"
    increase the current position
    we call the terminal at the current position "terminal2"
    select the Bi-Swing List for (terminal1, terminal2)
    get the transition identifier
    use it to get a sub-list of Bi-Swings that match this first connectability
    requirement.
    Get the right level of the current branch ending
    for all Bi-Swings in the sub-list
    {
        if the Bi-Swing that has a left slope span not larger than the right
        level. (3rd req.)
        {
            if zip check necessary (thus if right slope higher than left
            slope)
            {
                align the Zipper arrays of the current branch
                ending and of the Bi-Swing
                perform zip check
                if zip check failed
                    do next cycle of the loop, thus take next
                    Bi-Swing in the sub-list
            }
            append the Bi-Swing to the Branch Ending resulting in a
            new Branch ending
            tree structure
            calculate the properties of the Branch ending (equal to
            virtual sequence)
            keep the current Branch ending as part of the Bi-Swing
            sequence-tree structure
            if terminal 2 is not the "sentence-end" pseudo terminal
              call Recursively Grow Bi-Swing Tree Prolongations
            de-couple the last Bi-Swing again from the Branch ending
            (undo the append)
        }
    }
}

---

Partial and Full Bi-Swing Sequences

Let's assume forward parsing. It will sometimes happen that the end of the sentence couldn't be reached by an branch. In that case we consider the rightmost branch, corresponding with the longest possible valid Bi-Swing sequence. This sequence is an example of a partial parse and it can be of value too, for instance to pinpoint a problematic word in a sentence, or to deal with imperfect language input (defined as language input that doesn't perfectly fit into the grammar defined by the RTN). Other examples of partial parses are parse sequences that don't start from the first word, which is often done in island parsing and parallel parsing.

Forward, Backward and Island Parsing

See above

Converting a Bi-Swing-sequence-tree Structure to Parse Trees

Above is already described how from a branch reaching the other end, a sequence of Bi-Swings can be derived.

See FIG. 16

We still have to tell still how we turn such a particular sequence in a tree structure. We assume that the tree structure is based on the assumption that its nodes keep track of their child nodes.

First we expand the array of Bi-Swings into an array of Links by replacing each BiSwing by the Links they're made from.

Then we take the root node and set the linkpointer to the first link and the nodepointer to this root node.

Then we let proceed our linkpointer step by step toward the end, while generating a new node for each Link that ends on a calling transition. The new node is added to the child nodes of the current node, and the new node is set as current node. When we meet a Link that ends on an FSM call returning exit node, we take the mother node of the current node as the current node.

Finally, we arrive at the last link, and at that time, the nodepointer should point back to the root node.

The resulting parse tree reveals only the structure of the parse. If more detailed information is required, more information should be read from the Links and attached to the nodes, like for instance the name of the FSM the Link occurs in.

Attaching Probability to the Bi-Swings, Possibly from an RTN with Transition-attached Probabilities.

When a parse forest has more than one full parse tree, it would be advisable to rank them according to probability. If the RTN is probabilistically extended, by attaching probabilities to its FSM transitions that leave from the same FSM state, the probabilities can be calculated for Links and for Bi-Swings too. After normalisation, these are available after a Parse sequence is reached for attaching probabilities to each competing parse.

Extending the Bi-Swing Principle to n-Swings

Along the same principles, the entire system can be extended to Tri-Swings, Quadri-Swings, etc . . . , generally called n-Swings. A problem is that even for Tri-Swings the number of possible combinations gets huge, and we cannot keep everything in RAM memory or even on disk.

The solution is to keep only the most probable n-Swings and for the rest, use the Bi-Swing system.

The invention claimed is:

1. A language processing system taking as input a grammar model for a language, formulated as an RTN and, secondly, one or more partially overlapping sequences at a time, of concatenable terminals, or more specifically language elements, said set of input sequences together formulated as a sequence-chart of such elements, said system delivering as output a parse result for each incoming sequence-chart, obtained by applying a parse operation on said sequence-chart, characterised in that said system comprises:

memory access to store and consult a set of phonological, morphological, syntactical and/or semantic rules for a language, formulated as an RTN data-structure;

memory access to store and consult a plurality of n-Swings, in which n represents an integer number being at least 2, organised in lists of finite length, each list labelled with an n-fold of said language elements, and each n-Swing being defined as a unique path segment that is a contiguous part of at least one partial parse pathway (passing over transitions and jumps for FSM calling and returning), thus a Link sequence complying with the RTN, and that comprises one terminal transition at the start of the segment and one terminal transition at the end of the segment, and includes n-2 terminal transitions in between;

derivation means to derive said lists of n-Swings for a given n from the RTN, while limiting the length of the n-Swings to a predetermined number of transitions to prevent infinite lengths, by applying the following algorithms for deriving n-Swings in three phases, the first phase being the generation of all possible Links in every FSM of said RTN, the second phase being the generation of all possible Bi-Swings in the RTN, the Bi-Swings being limited by a fixed limit on the length of its sequence of Links and/or by a limit of the call level span;

the optional third phase being the generation of all possible n-Swings for a predetermined integer n>2, which are calculated by induction in recursive incremental phases, starting by calculating 3-Swings, by either left or right attachment of matching Bi-Swings to (n−1)-Swings, parsing means provided to derive a parse result from said supplied token sequence-chart of concatenable language elements by using said lists of n-Swings, said parsing means being provided to build all possible parses, by building a list of every n-Swings that matches a full sequence of N language elements that is derivable from said input sequence-chart;

an optional means to derive a parse result from said supplied token sequence-chart of concatenable language elements, by seeding the set of possible parses, each regarded as Link sequences, from the set of n-Swings of the n-Swing list associated with an n-fold of n subsequent language elements, as occurs at the start or the end of a sequence comprised in the sequence-chart, and by trying to extend each seed of a parse by repeatedly attaching matching subsequent n-Swings at the begin or the end of the open ended sides of its Link sequences, while taking the subsequent n-Swings from lists that are associated with a sequence of n language elements as they occur directly at the one, respectively the other side of those language elements in the supplied sequence as derived from the sequence chart, that have not yet been associated with a set of n-Swings, said parsing means being also provided to multiply the built-up Link sequences each time multiple possibilities exist for extension, such that every extension possibility is generated and every possibility is unique and for rejecting extensions that contain non-matching call correspondences at any call level and for rejecting extensions that contain below zero calling levels, and for rejecting extensions that would contain call level differences exceeding a predetermined threshold value and for rejecting Link sequences that can't be extended, said parsing means being further provided to form a list of parse result contributions, being a list of only those Link sequences that span the longest length of the supplied sequence and for organising each parse result contribution as a tree structure, said parsing means provided to further add all parse trees for each possible element sequence possible according to the supplied input sequence-chart and finally summarising the entire parse result in one parse forest, containing all parse trees or no parse tree if no full parse was found, or in, equivalently, a parse tree chart.

2. A method to generate all Links and Bi-Swings in an RTN for use in a language processing system as claimed in claim 1, according to the following pseudo algorithm, in which loops are marked as for and conditions as if and parentheses delimit looped or conditional blocks, and in which a sequence of Links is called a path:

```
Generate All Links function
{
    for every FSM in the RTN
    {
        start a path from the entry state
        set the entry state as the current state
        call Recursively Generate Links the current FSM and for the current entry
        state and the current path
    }
}
Recursively Generate Links function for an FSM, a State and a current path
{
    for every transition starting from the current state
    {
        if it's a calling transition, calling another FSM2
        {
            if the path started at the entry state generate a Link of type 8 for the
currently obtained path
            else if the path started at a terminal transition generate a Link of
type 2 for the currently obtained path
            else (the past must have started at a calling transition) generate a
Link of type 5 for the currently obtained path
        }
        else if it's a terminal transition
        {
            if the path started at the entry state, generate a Link of type 7 for
the currently obtained path
            else if the path started at a terminal transition generate a
Link of type 1 for the currently obtained path
            else (the past must have started at a calling transition), generate a
Link of type 4 for the currently obtained path
        }
        else it must be a zero transition
```

-continued

```
            {
                if the path hasn't yet reached a predetermined maximal length
                {
                    append the zero transition at the end of the path and set the
                    current state to the state at the other side of the zero
                    transition;
                    call Recursively Generate Links function for the current FSM,
            state and path
                    remove the zero transition again from the end of the current
            path
                }
                if the current state is the exit state
                {
                        if the path started at a terminal transition, generate a
        Link of type 3 for the currently obtained path
                        else (the past must have started at a calling
        transition), generate a Link of type 6 for the currently obtained path
                }
            }
        }
}
Generate All Bi-Swings function for a given RTN
{
    for every nonzero terminal1 in the RTN
    {
        for every Link starting with a terminal1 transition
        {
            start a path (a sequence of Links ) from this Link, choose it as the
        current path.
            call Recursively Generate Bi-Swings for the current path and
        terminal 1
        }
    }
}
Recursively Generate Bi-Swings function for a current path and terminal 1
{
    consider the transition on which the last link of the current path ends for all links
that start from this same transition
        {
            if Link is not climbing regarding call level OR (Link is climbing AND there is
            a corresponding Link in the down slope of the Link path)
            {
                append the Link at the end of the current path if the Link doesn't
                end on a terminal 2
                {
                    if the level span of the path isn't too high
                    {
                        call Recursively Generate Bi-Swings function for the
                        current path and terminal 1
                    }
                }
                else (the Link ends on terminal 2)
                {
                    generate a Bi-Swing from the current path add the Bi-Swing
        to the Bi-Swing list for (Terminal 1,Terminal 2)
                }
                remove the Link again from the end of the path
            }
        }
}.
```

3. A method to parse an input sequence of N elements for use in a language processing system as claimed in claim 1, that assumes availability of at least all possible Bi-Swings for the given RTN, each calculated and stored from before, said method in a first phase dividing up the entire sequence in contiguous non-overlapping sub-sequences of at least length 2, such that for each sub-sequence of length m there is a corresponding complete set of m-Swings pre-calculated, stored and available, and said method, in a second phase gradually multiplying and unifying neighbouring m- and m'-Swing-sets by controlling if a combination of both matches and if so by joining them to into all possible combined (m+m')-Swings corresponding to sub-sequences of length (m+m') of the input sequence, taking into account that if n-Swings correspond with sub-sequences that include the first or last element in the sequence, matching includes base call-level checking, said method resulting in a final list of 0 or more N-Swings matching the entire sequence of N elements, each of which is equivalent with a parse tree.

4. A language processing system as claimed in claim 1, characterised in that the stored and accessible RTN datastructure is supplemented with accessible storage for probabilistic weights attached to all transitions leaving from every state, in every FSM of the RTN, and that said input sequence chart is potentially supplemented with probabilities attached to each arc, said parsing means being provided to take into account said probabilities into each full parse alternative within the parse result, by applying the statistical laws on such probabilities, and optionally other available probabilistic information, along the way and assigning a resulting probability to each individual parse.

* * * * *